(12) United States Patent
Seo et al.

(10) Patent No.: US 11,435,552 B2
(45) Date of Patent: Sep. 6, 2022

(54) OPTICAL LENS ASSEMBLY AND ELECTRONIC DEVICE COMPRISING SAME

(71) Applicant: Samsung Electronics Co., Ltd., Gyeonggi-do (KR)

(72) Inventors: Jin-seon Seo, Gyeonggi-do (KR); Sang-yong Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/485,921

(22) PCT Filed: Mar. 6, 2018

(86) PCT No.: PCT/KR2018/002636
§ 371 (c)(1),
(2) Date: Aug. 14, 2019

(87) PCT Pub. No.: WO2018/174431
PCT Pub. Date: Sep. 27, 2018

(65) Prior Publication Data
US 2020/0041761 A1 Feb. 6, 2020

(30) Foreign Application Priority Data
Mar. 22, 2017 (KR) .......................... 10-2017-0036190

(51) Int. Cl.
*G02B 9/34* (2006.01)
*G02B 7/10* (2021.01)
(Continued)

(52) U.S. Cl.
CPC ................. *G02B 9/34* (2013.01); *G02B 7/10* (2013.01); *H04N 5/33* (2013.01); *G06V 40/13* (2022.01)

(58) Field of Classification Search
CPC ... G02B 9/34; G02B 7/10; G02B 9/62; G02B 13/0045; G02B 13/008; G02B 13/14;
(Continued)

(56) References Cited

U.S. PATENT DOCUMENTS

| 4,596,447 A | 6/1986 | Tamada et al. |
| 4,708,442 A | 11/1987 | Fujii et al. |

(Continued)

FOREIGN PATENT DOCUMENTS

| EP | 2495596 A2 | 9/2012 |
| JP | 7-72387 A | 3/1995 |

(Continued)

OTHER PUBLICATIONS

International Search Report dated Jun. 22, 2018.
Korean Search Report dated Oct. 20, 2021.
Korean Notice of Allowance dated Dec. 24, 2021.

*Primary Examiner* — James C. Jones
(74) *Attorney, Agent, or Firm* — Cha & Reiter, LLC

(57) ABSTRACT

Provided are an optical lens assembly and an electronic apparatus. The optical lens assembly includes a first lens having a positive refractive power, a second lens having a negative refractive power, a third lens having a positive refractive power, a fourth lens having a refractive power, and a moving lens group movable to be inserted in or removed from between the third lens and the fourth lens, wherein the first, second, third, and fourth lenses and the moving lens group are sequentially arranged from an object side to an image side. The moving lens group is moved between the third lens and the fourth lens for infrared (IR) photography.

14 Claims, 18 Drawing Sheets

(51) Int. Cl.
*H04N 5/33* (2006.01)
*G06V 40/13* (2022.01)

(58) Field of Classification Search
CPC .......... G02B 9/60; G02B 5/208; G02B 13/18;
H04N 5/33; G06V 40/13; G06V 10/12;
G06V 40/19; G06V 40/18
See application file for complete search history.

(56) References Cited

U.S. PATENT DOCUMENTS

| | | | |
|---|---|---|---|
| 4,715,693 | A | 12/1987 | Takase et al. |
| 4,887,107 | A | 12/1989 | Nakamura et al. |
| 5,513,042 | A * | 4/1996 | Itoh .......................... G02B 9/34 359/674 |
| 5,548,446 | A | 8/1996 | Enomoto |
| 7,969,486 | B2 | 6/2011 | Nanjo |

FOREIGN PATENT DOCUMENTS

| | | | | |
|---|---|---|---|---|
| JP | 2002-244037 | A | | 8/2002 |
| JP | 2009-42563 | A | | 2/2009 |
| JP | 203549 | | * | 9/2009 ............. G02B 15/16 |
| JP | 2011-53526 | A | | 3/2011 |

* cited by examiner

OPTICAL LENS ASSEMBLY AND ELECTRONIC DEVICE COMPRISING SAME

CROSS REFERENCE TO RELATED APPLICATIONS

This application is a National Phase Entry of PCT International Application No. PCT/KR2018/002636, which was filed on Mar. 6, 2018, and claims a priority to Korean Patent Application No. 10-2017-0036190, which was filed on Mar. 22, 2017, the contents of which are incorporated herein by reference.

TECHNICAL FIELD

The present disclosure relates to optical lens assemblies and electronic apparatuses including the same, and more particularly, to an optical lens assembly that is compact and is capable of infrared photographing and visible-light photographing, and an electronic apparatus including the optical lens assembly.

BACKGROUND ART

In relation to compact photographing camera systems, camera modules for communication terminals, digital still cameras (DSCs), camcorders, personal computer (PC) cameras (photographing apparatuses attached to PCs), and the like are being actively researched. In particular, the use of cameras including solid-state imaging devices such as charge coupled devices (CCDs) and complementary metal oxide semiconductor (CMOS) image sensors has been rapidly increasing. To obtain an image, this camera module includes a photographing lens that forms an image.

Recently, the use of iris cameras has been increasing. When an iris camera uses an iris lens, the iris camera includes an optical system module corresponding to an infrared (IR) region. This addition of a special optical system module may increase the sizes of iris cameras and the prices thereof.

Because front cameras in mobile electronic apparatuses are widely used for video calls and selfie taking, the front cameras generally have a viewing angle of 60° or greater in consideration of the general arm length of people such that a person can take a selfie of his or her entire face at a distance of about 20-50 cms. In this case, the entire face of a person is formed on an image sensor, but an iris size makes it difficult to accurately recognize the iris of the person.

DESCRIPTION OF THE EMBODIMENTS

Technical Problem

Provided is an optical lens assembly capable of securing an optical performance even in an infrared (IR) region, without special focusing, by inserting a moving lens group for the IR region into a visible-light optical system.

Provided is also an electronic apparatus including the optical lens assembly capable of securing an optical performance with respect to IR rays.

Solution to Problem

According to an aspect of the present disclosure, an optical lens assembly according to an embodiment may include a first lens having a positive refractive power, a second lens having a negative refractive power, a third lens having a positive refractive power, a fourth lens having refractive power, and a moving lens group that is movable to be inserted in or removed from between the third lens and the fourth lens, wherein the first, second, third, and fourth lenses and the moving lens group are sequentially arranged from an object side to an image side, and the moving lens group may be moved between the third lens and the fourth lens for infrared (IR) photography and may satisfy the following inequality:

$$0.14 < T34/OAL < 0.3$$

$$V3 - V2 > 35 \qquad \text{<Inequality>}$$

where T34 indicates an air gap between the third lens and the fourth lens, OAL indicates an overall length of the optical lens assembly, V2 indicates an Abbe number of the second lens, and V3 indicates an Abbe number of the third lens.

According to an aspect of the present disclosure, an optical lens assembly according to another embodiment may include a first lens having a convex object side surface, a second lens arranged on an image side of the first lens and having a concave image side surface, a third lens arranged on an image side of the second lens, and an image side lens arranged closest to the image side, and may include a moving lens group that is movable to be inserted in or removed from between the third lens and the image side lens. The moving lens group may include an IR pass coating.

According to an aspect of the present disclosure, an electronic apparatus according to an embodiment may include an optical lens assembly and an image sensor, and the optical lens assembly may include a first lens having a positive refractive power, a second lens having a negative refractive power, a third lens having a positive refractive power, a fourth lens having a refractive power, and a moving lens group that is movable to be inserted in or removed from between the third lens and the fourth lens, wherein the first, second, third, and fourth lenses and the moving lens group are sequentially arranged from an object side to an image side. The moving lens group is moved between the third lens and the fourth lens for IR photography, and may satisfy the following inequality:

$$0.14 < T34/OAL < 0.3$$

$$V3 - V2 > 35 \qquad \text{<Inequality>}$$

where T34 indicates an air gap between the third lens and the fourth lens, OAL indicates an overall length of the optical lens assembly, V2 indicates an Abbe number of the second lens, and V3 indicates an Abbe number of the third lens.

MODE OF DISCLOSURE

Figure 1:
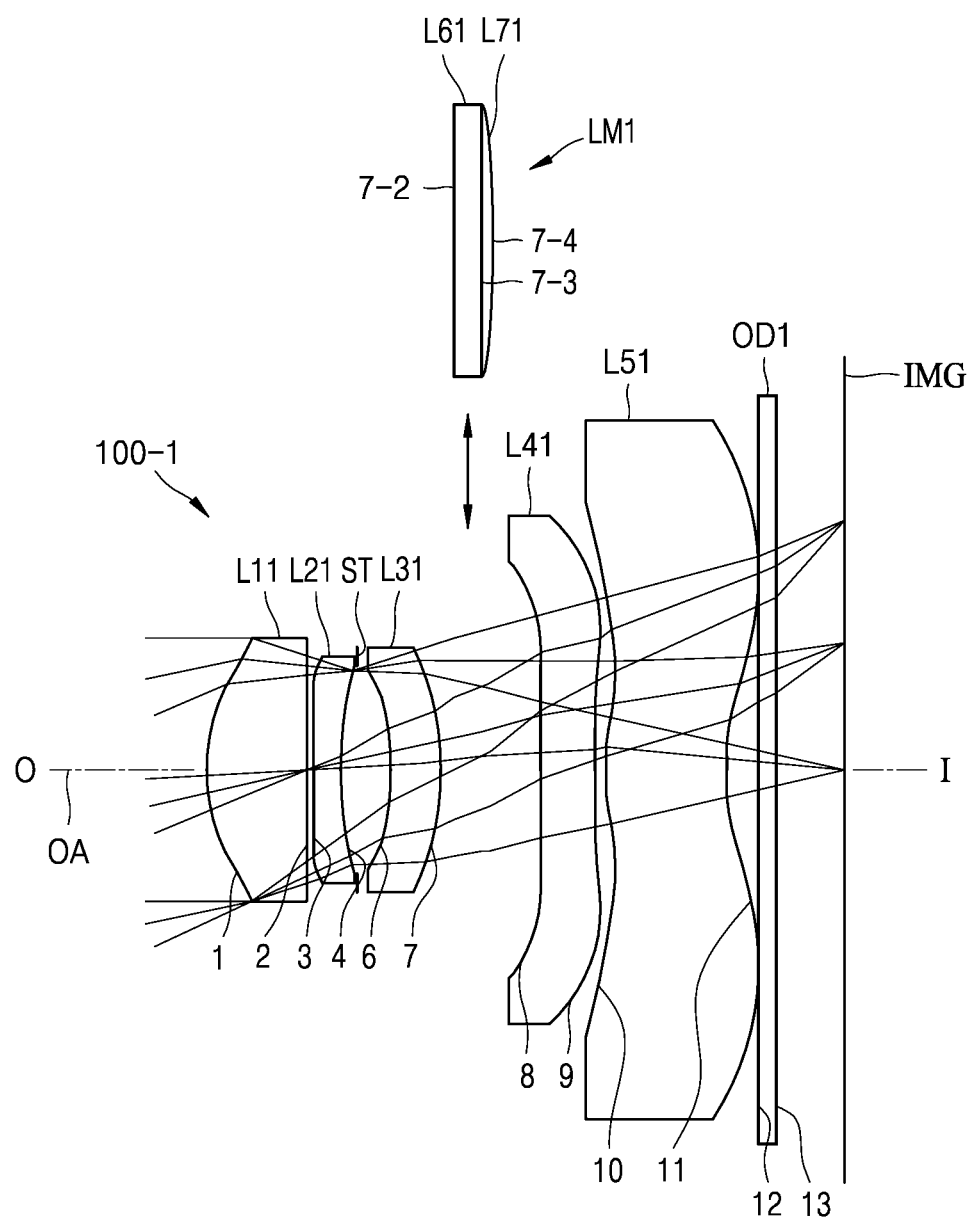
FIG. 1 illustrates an optical lens assembly according to a first numerical embodiment, according to various embodiments.

Hereinafter, various example embodiments of the present disclosure will be described below with reference to accompanying drawings. However, this is not intended to limit the present disclosure to particular modes of practice, and it is to be appreciated that all modifications, equivalents, and/or alternatives that do not depart from the spirit and technical scope of the disclosure are encompassed in the disclosure. Like reference numerals denote the same elements.

Herein, expressions such as "having," "may have," "comprising," and "may comprise" indicate the existence of a corresponding characteristic (e.g., an element such as a numerical value, function, operation, and/or component) and do not exclude the existence of an additional characteristic.

As used in the present disclosure, the terms "A or B," "at least one of A and/or B," and "one or more of A and/or B" may include any one of listed items and all of at least one combination of the items. For example, "A or B", "at least one of A and B", or "at least one of A or B" may include (1) at least one A, (2) at least one B, or (3) at least one A and at least one B.

While such terms as "first", "second", etc., may be used to describe various components, such components must not be limited to the above terms. The above terms are used only to distinguish one component from another. For example, a first user device and a second user device may indicate different user devices regardless of an order or an importance. For example, a first element could be termed a second element without deviating from the scope of the present embodiments, and similarly, a second element may be termed a first element.

When an element (e.g., a first element) is "operatively or communicatively coupled to" or "connected to" another element (e.g., a second element), the first element may be directly connected to the second element or a third element may exist therebetween. However, when the first element is "directly connected to" or "directly coupled to" the second element, no intermediate element exists therebetween.

The expression "configured to (or set to)" used in the present disclosure may be used interchangeably with, for example, "suitable for", "having the capacity to", "designed to", "adapted to", "made to", or "capable of", according to situations. The expression "configured to (or set to)" may not only necessarily refer to "specifically designed to" in terms of hardware. Instead, in some situations, the expression "device configured to" may refer to a situation in which the device is "capable of" together with another device or parts. For example, the phrase "a processor configured (or set) to perform A, B, and C" may mean a dedicated processor (such as an embedded processor) for performing a corresponding operation, or a generic-purpose processor (such as a central processing unit (CPU) or an application processor (AP)) that can perform a corresponding operation by executing one or more software programs stored in a memory device.

Terms defined herein are used for only describing a specific embodiment and are not intended to limit the scope of other embodiments. An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs. It will be further understood that terms defined in commonly used dictionaries should be interpreted as having meanings that are the same as or similar to their meaning in the context of the relevant art and will not be interpreted in an idealized or overly formal sense unless expressly so defined herein. In some case, terms defined herein cannot be interpreted to exclude embodiments of the present disclosure.

The term "electronic apparatus" according to various embodiments of the present disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PDP), an MP3 player, a mobile medical device, a camera, or a wearable device. According to various embodiments, a wearable device may include at least one of an accessory type device (e.g., a watch, a ring, a bracelet, an anklet, a necklace, glasses, contact lenses, or head-mounted-device (HMD)), a fabric or clothing-integrated type device (e.g., electronic clothing), a body-attached type device (e.g., a skin pad or tattoo), or a body-implanted type device (e.g., an implantable circuit).

According to some embodiments, the electronic apparatus may be a home appliance. The home appliance may include at least one of, for example, a television (TV), a digital video disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® or PlayStation®), an electronic dictionary, an electronic key, a camcorder, or an electronic frame.

According to another embodiment, the electronic apparatus may include at least one of various medical equipment (e.g., various portable medical measurement systems, such as a blood sugar measurement device, a heartbeat measurement device, a blood pressure measurement device, or a body temperature measurement device, a magnetic resonance angiography (MRA) device, a magnetic resonance imaging (MRI) device, a computed tomography (CT) device, an imaging device, or an ultrasonic device), a navigation system, a global navigation satellite system (GNSS), an event data recorder (EDR), a flight data recorder (FDR), a vehicle infotainment device, electronic equipment for ships (e.g., navigation system and gyro compass for ships), avionics, a security device, a vehicle head unit, an industrial or home robot, an automatic teller machine (ATM), a point of sales (POS) device, or Internet of Things (IoT) device (e.g., light bulbs, various sensors, electricity or gas meters, sprinkler devices, fire alarm devices, thermostats, streetlights, toasters, exercise machines, hot-water tanks, heaters, boilers, etc.).

According to some embodiments, the electronic apparatus may include at least one of a part of a furniture or building/structure, an electronic board, an electronic signature receiving device, a projector, or various measuring instruments (e.g., a water, electricity, gas, or electric wave measuring device). According to various embodiments, the electronic apparatus may be one of the above-listed devices or a combination thereof. According to some embodiments, the electronic apparatus may be a flexible electronic apparatus. Obviously, the electronic device is not limited to the above-listed devices and may include new electronic devices according to new technical developments.

Electronic apparatuses according to various embodiments will now be described with reference to the accompanying drawings. Herein, the term "user" may refer to a person who uses the electronic apparatus or an apparatus (e.g., an artificial intelligence electronic apparatus) using the electronic apparatus.

Optical lens assemblies according to various embodiments, and apparatuses including the same, will now be described in detail with reference to the accompanying drawings.

FIG. 1 is a schematic structural view of an optical lens assembly 100-1 according to a first numerical embodiment according to various embodiments.

The optical lens assembly 100-1 according to various embodiments may include three or more lenses arranged in a direction from an object side O to an image side I. Hereinafter, when components of each lens are described, the image side I may denote the side towards an image plane IMG in which an image is focused and the object side O may denote the side towards an object whose image is to be captured. In addition, "object side surface" of a lens denotes the lens surface closer to the object, that is, the left surface on the drawings, and an "image side surface" of the lens denotes the lens surface closer to the image plane IMG, that is, the right surface on the drawings. The image plane IMG may be, for example, an imaging device surface or an image sensor surface. An image sensor may be, for example, a sensor such as a complementary metal oxide semiconductor (CMOS) image sensor or a charge coupled device (CCD). The image sensor is not limited thereto and may be, for example, may be any device that converts an image of an object into an electric image signal.

According to various embodiments, a moving lens group LM1 may be included which is moved to be inserted in or removed from between adjacent ones of three or more lenses. For example, a first lens L11, a second lens L21 arranged on an image side of the first lens L11, a third lens L31 arranged on an image side of the second lens L21, and a fourth lens L41 arranged on an image side of the third lens L31 may be included. The moving lens group LM1 may be moved to be inserted in or removed from between the third lens L31 and the fourth lens L41. However, embodiments are not limited thereto, and a moving lens group may be provided to be inserted in or removed from between other lenses. The optical lens assembly 100-1 may further include a fifth lens L51 arranged closest to the image side I.

The first lens L11 may have positive refractive power. For example, the first lens L1-1 may have an object side surface 1 that is convex towards the object side O. For example, the first lens L1-1 may be a biconvex lens. The second lens L21 may have negative refractive power. For example, the second lens L21 may have an object side surface 4 that is concave towards the image side I. The third lens L31 may have positive refractive power. For example, the third lens L31 may be a meniscus lens that is convex towards the image side I. The fourth lens L41 may have positive refractive power or negative refractive power.

The fifth lens L51 may have positive refractive power or negative refractive power. The fifth lens L51 may have at least one inflection point. For example, the fifth lens L51 may have a shape that is concave toward the object side O in a region adjacent to an optical axis OA. The region adjacent to the optical axis may denote a region within a predetermined range of radius from the optical axis (for example, a region at an initial inflection point position). An inflection point may refer to a point at which the sign of the radius of curvature of a lens surface changes from positive (+) to negative (−), or from negative (−) to positive (+). Alternatively, the inflection point may refer to a point at which the shape of a lens changes from convex to concave, or from concave to convex. The radius of curvature may refer to, for example, a value indicating the degree of curvature at each point on a curved surface or a curve. An object side surface 10 of the fifth lens L51 may be centrally convex toward the object side O and peripherally concave toward the object side O. An image side surface 11 of the fifth lens L51 may be centrally concave toward the image side I and peripherally convex toward the image side I.

An optical lens assembly according to various embodiments may include at least one aspherical lens. For example, each of the first lens L11, the second lens L21, the third lens L31, the fourth lens L41, and the fifth lens L51 may include at least one aspherical surface. For example, each of the first lens L11, the second lens L21, the third lens L31, the fourth lens L41, and the fifth lens L51 may include aspherical surfaces on both sides.

According to various embodiments, a stop ST may be positioned between the second lens L21 and the third lens L31. The stop ST may adjust a diameter of luminous flux, and may include, for example, an aperture stop, a variable stop, or a mask type stop. According to various embodiments, at least one optical device OD1 may be disposed between the fifth lens L51 and the image plane IMG. The optical device OD1 may include, for example, at least one of a broad band pass filter or a cover glass. For example, when a broad band-pass filter is included as an optical device, the broad band-pass filter may include a broad band coating that passes light having a wavelength of 400 to 1000 nm.

The broad band-pass filter may pass, for example, both visible light and infrared (IR) light. However, an optical lens assembly may include no optical devices.

The optical lens assembly according to various embodiments may include four or more lenses, may have a high resolution, may be made compact, and may provide a bright photographing optical system lens that provides good aberration characteristics and has an F number of 2.0 or less.

The moving lens group LM1 of the optical lens assembly according to various embodiments enables an image to be captured by using IR light. The moving lens group LM1 may include at least one lens. For example, the moving lens group LM1 may include a lens of which one surface is planar. For example, the moving lens group LM1 may include a sixth lens L61 having a flat panel form, and a seventh lens L71 of which one surface is planar and another surface is convex. The sixth lens L61 and the seventh lens L71 may be bonded with each other. Each of the sixth lens L61 and the seventh lens L71 may be a spherical lens. When a flat panel lens and a convex lens are bonded with each other as described above, IR pass coating may be easily performed.

The moving lens group LM1 may include, for example, an IR pass coating or a visible-light block coating. When an IR pass coating is included, visible light may be blocked from being passed, and IR light may be passed and transmitted to an image plane. The IR pass coating may be fabricated using a material that blocks (or reflects) visible light, or may be fabricated using a material that absorbs visible light.

Figure 2:
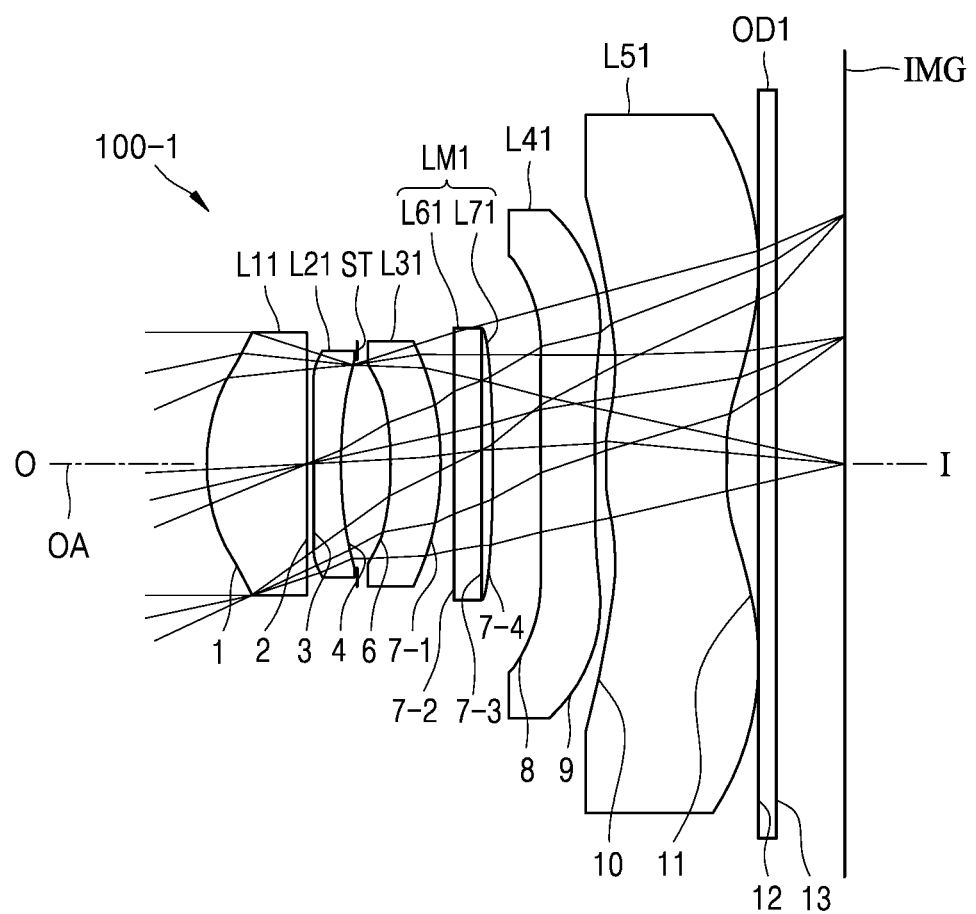
FIG. 2 illustrates a moving lens group inserted between lenses in the optical lens assembly according to the first numerical embodiment, according to various embodiments.

FIG. 1 illustrates the moving lens group LM1 positioned by moving and deviating from the optical axis OA of the optical lens assembly 100-1. In this case, an image may be captured using visible light. FIG. 2 illustrates the moving lens group LM1 that is moved to be inserted between the third lens L31 and the fourth lens L41. In this case, light in a visible light region is blocked and light in an IR light region is passed, thereby forming a light on the image plane.

When the moving lens group LM1 is moved on the optical axis OA, an iris may be photographed using IR light. IR light may be more suitable than visible light for iris photographing. When light is reflected by the eyes of a user, because reflectivity of visible light by corneas is high, a cornea image due to visible light reflected by the corneas may make it difficult to precisely capture an iris image. Accordingly, an iris image may be more precisely obtained by blocking visible light by using an IR light pass coating.

The optical lens assembly according to various embodiments have a high pixel, bright-lens, and slimmed structure, and enable photographing in an IR region by moving the moving lens group LM1. The moving lens group LM1 may be used to correct a focus difference that is generated according to the wavelengths of visible light and IR light. Because a special module for focusing does not need to be added during IR photographing, miniaturization may be accomplished and production costs may be reduced. The optical lens assembly according to various embodiments may correct a focus difference according to an object distance difference by using the moving lens group LM1.

For example, when the optical lens assembly according to various embodiments is a fixed focus system, a large focus difference according to an object distance and a light wavelength may be generated. For example, when it is assumed that an object distance in a visible light region is 50 cm and an object distance in an IR light region as an iris recognition distance is 30 cm, a focus difference according to a difference between the object distances may be about 20 um. A best focus difference according to the wavelength of light may be about 10 um. Accordingly, a focus difference according to the object distances and the wavelength of light may be a total of 30 um or greater, and thus it is difficult to secure a resolving power performance. High-pixels bright lenses make the focus difference worse, and this focus difference should be corrected to secure a desired resolution. Because high-pixel bright lenses have small depths of field, when a focus deviates by 10 um or greater, a resolving power performance may be greatly degraded. By compensating for this problem, the moving lens group LM1 may be configured to correct the focus difference according to the object distances and the wavelength of light. Thus, a flare phenomenon may be reduced, sensitivity may be reduced, and aberration characteristics may be improved.

The optical lens assembly according to various embodiments may secure a space between the third lens L31 and the fourth lens L41 such that a moving lens group may be switched, may have a small number of lenses for the moving lens group, and may be made compact by using a slim lens.

Figure 5:
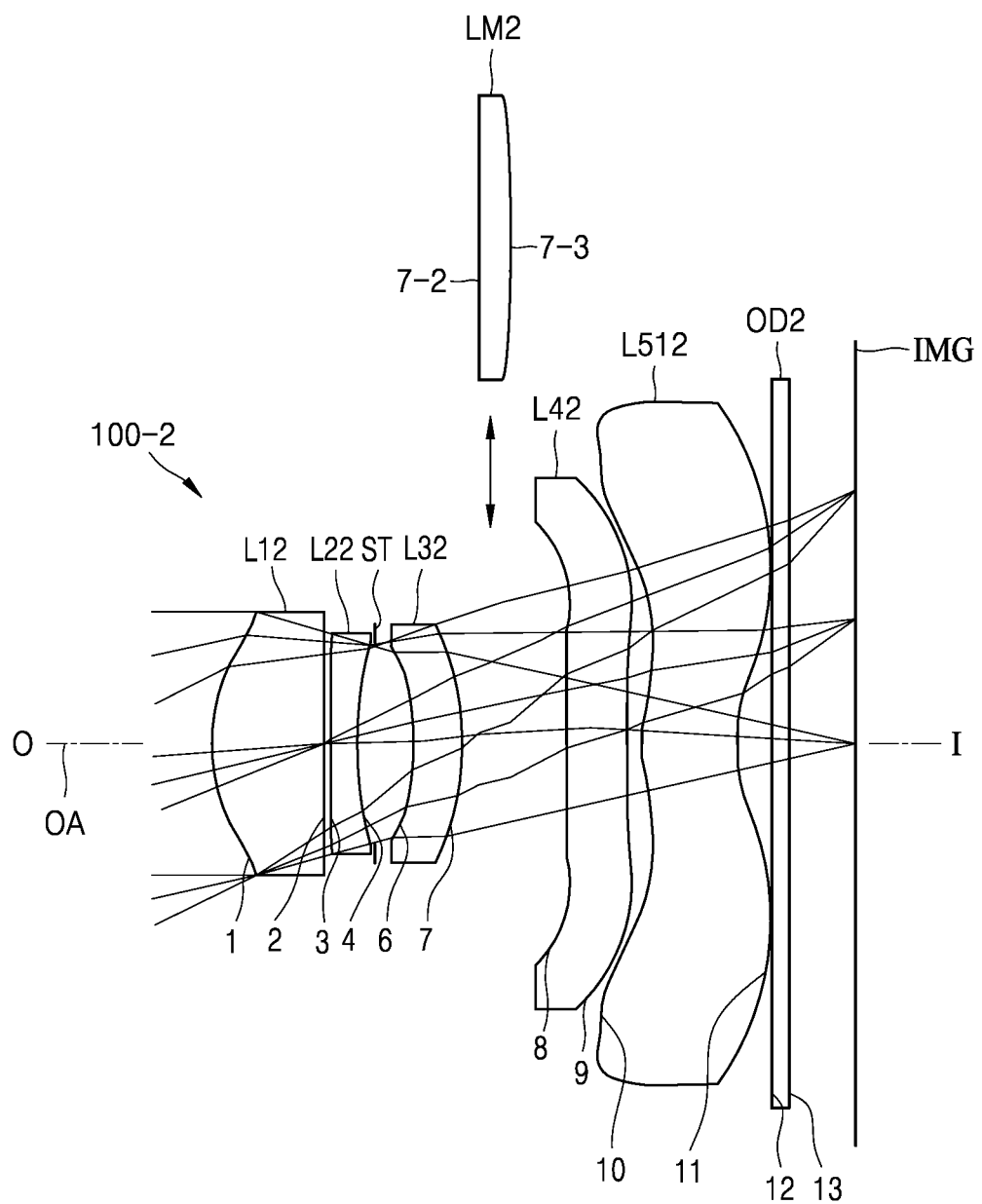
FIG. 5 illustrates an optical lens assembly according to a second numerical embodiment, according to various embodiments.

FIG. 5 illustrates an optical lens assembly 100-2 according to a second numerical embodiment, according to various embodiments.

Figure 6:
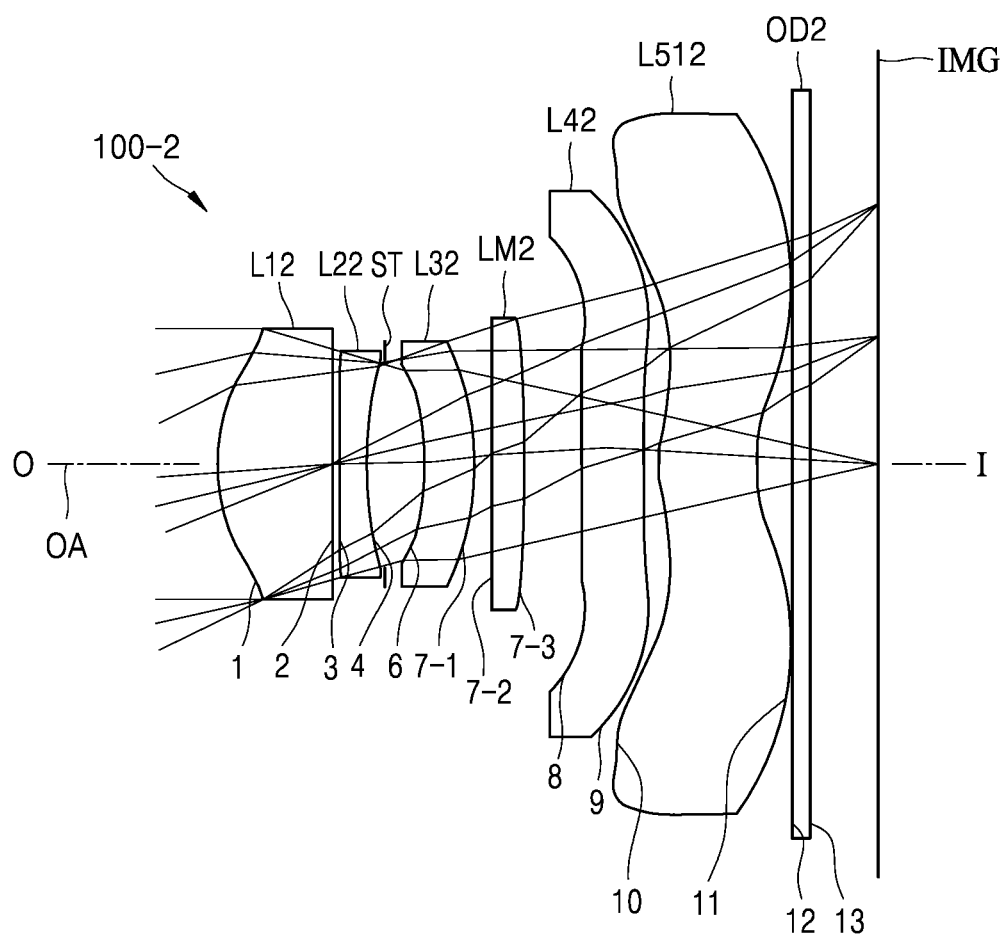
FIG. 6 illustrates a moving lens group inserted between lenses in the optical lens assembly according to the second numerical embodiment, according to various embodiments.

The optical lens assembly 100-2 according to various embodiments may include a first lens L12 having positive refractive power, a second lens L22 having negative refractive power, a third lens L32 having positive refractive power, a fourth lens L42, and a fifth lens L52 having positive refractive power, wherein the first, second, third, fourth, and fifth lenses L12, L22, L32, L42, and L52 are sequentially arranged from the object side O to the image side I. According to various embodiments, a moving lens group LM2 may be included which is moved to be inserted in or removed from between the third lens L32 and the fourth lens L42. The moving lens group LM2 may include, for example, a lens having a meniscus shape that is convex toward the image side I. The moving lens group LM2 may include an aspherical lens. For example, the moving lens group LM2 according to the present embodiment may include a double-sided aspheric lens. FIG. 6 illustrates a case where the moving lens group LM2 of the optical lens assembly 100-2 according to the second numerical embodiment is moved to deviate from the optical axis OA.

At least one optical device OD2 may be disposed between the fifth lens L52 and the image plane IMG. According to the present embodiment, a description of similar components to those in the first numerical embodiment will be omitted.

Figure 9:
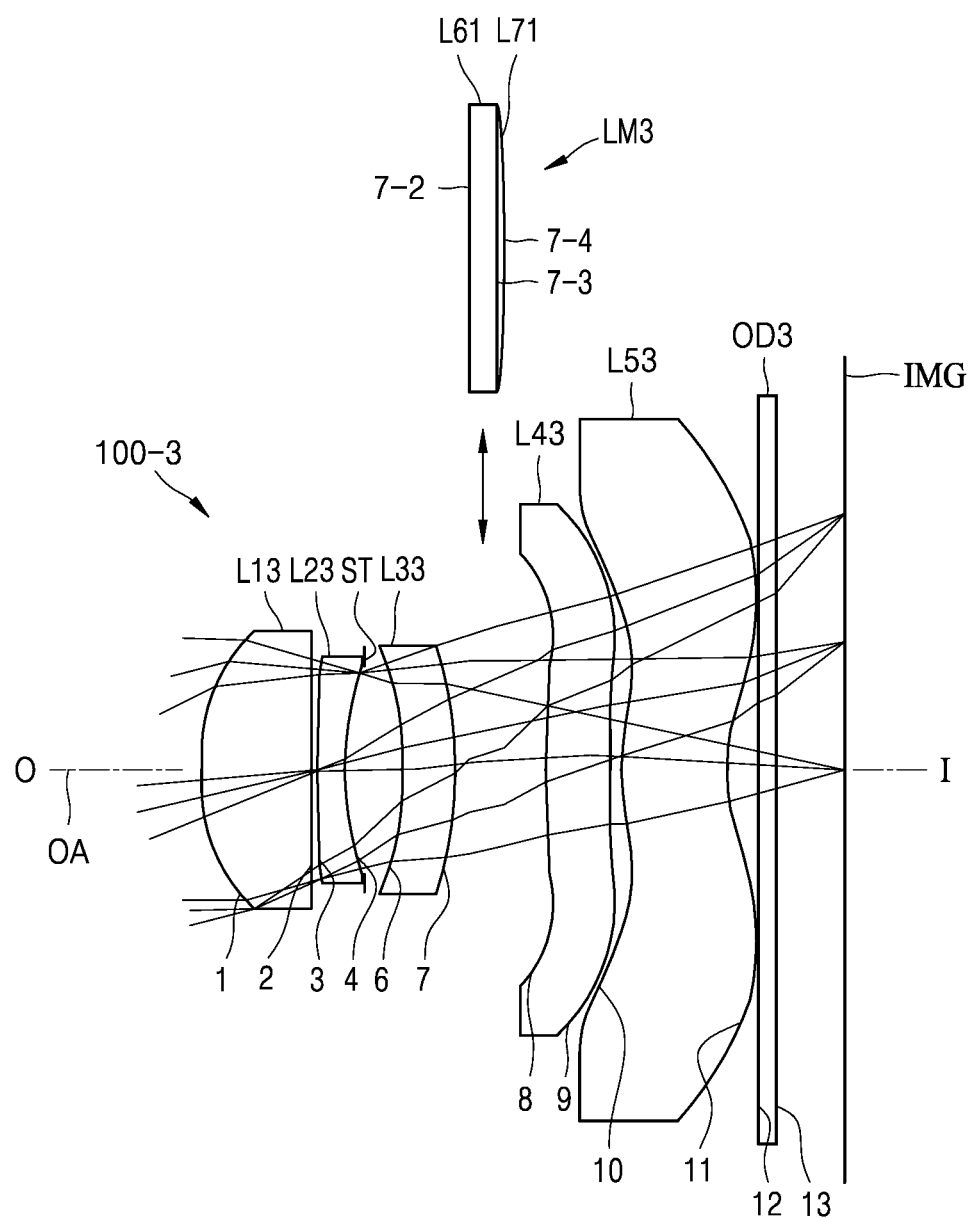
FIG. 9 illustrates an optical lens assembly according to a third numerical embodiment, according to various embodiments.

FIG. 9 illustrates of an optical lens assembly 100-3 according to a third numerical embodiment, according to various embodiments.

Figure 10:
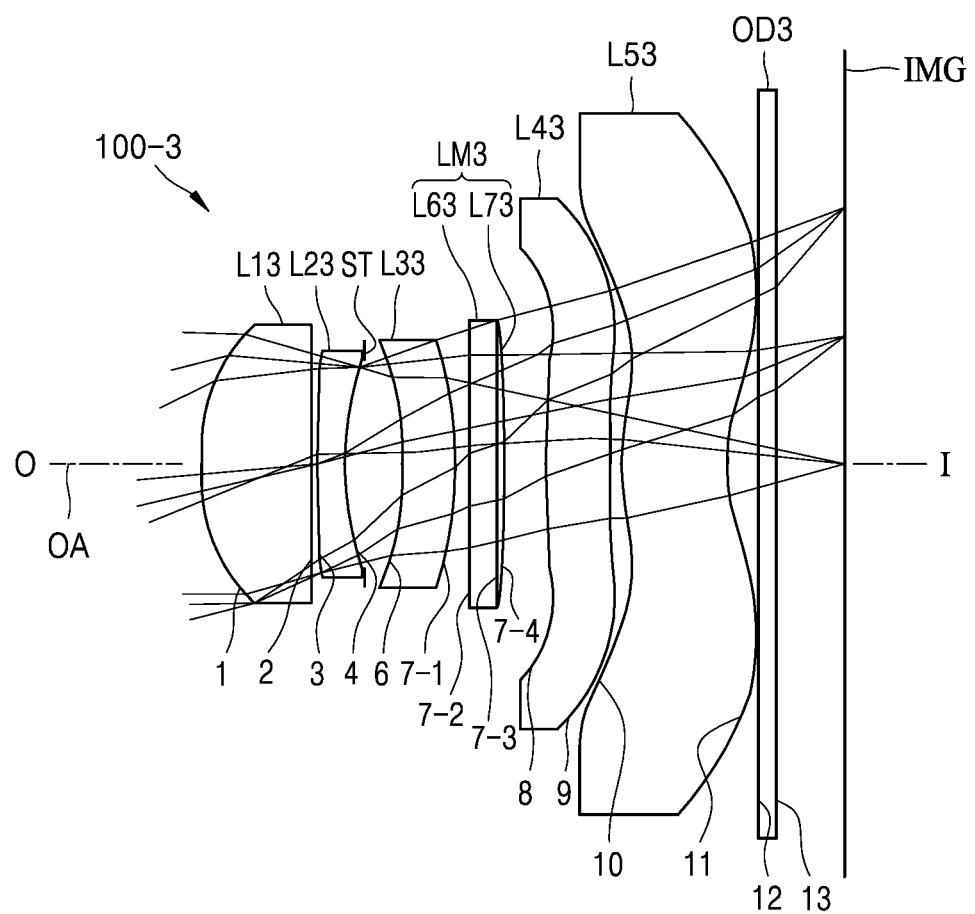
FIG. 10 illustrates a moving lens group inserted between lenses in the optical lens assembly according to the third numerical embodiment, according to various embodiments.

The optical lens assembly 100-3 according to various embodiments may include a first lens L13 having positive refractive power, a second lens L23 having negative refractive power, a third lens L33 having positive refractive power, a fourth lens L43, and a fifth lens L53 having refractive power, wherein the first, second, third, fourth, and fifth lenses L13, L23, L33, L43, and L53 are sequentially arranged from the object side O to the image side I. According to various embodiments, a moving lens group LM3 may be included which is moved to be inserted in or removed from between the third lens L33 and the fourth lens L43. For example, the moving lens group LM3 may include a sixth lens L63 having a flat panel form, and a seventh lens L73 of which one surface is planar and another surface is convex. The sixth lens L63 and the seventh lens L73 may be bonded with each other. Each of the sixth lens L63 and the seventh lens L73 may be a spherical lens. FIG. 10 illustrates a case where the moving lens group LM3 of the optical lens assembly 100-3 according to the third numerical embodiment is moved to deviate from the optical axis OA.

At least one optical device OD3 may be disposed between the fifth lens L53 and the image plane IMG.

The optical lens assembly according to various embodiments may satisfy the following inequalities. The following inequalities will be described with reference to the optical lens assembly 100-1 according to the first numerical embodiment of FIG. 1. However, the same description may be applied to other numerical embodiments.

$$0.14 < T34/OAL < 0.3 \qquad \text{<Inequality 1>}$$

$$V3 - V2 > 35 \qquad \text{<Inequality 2>}$$

In Inequalities 1 and 2, T34 indicates an air gap between the third lens L31 and the fourth lens L41, OAL indicates an overall length of the optical lens assembly, V2 indicates an Abbe number of the second lens, and V3 indicates an Abbe number of the third lens. The overall length of the optical lens assembly refers to a distance from an object side surface of the first lens L11 to the image plane IMG, and the air gap between the third lens L31 and the fourth lens L41 refers to a gap between an image side surface 7 of the third lens L31 and an object side surface 8 of the fourth lens L41.

Inequality 1 limits a ratio between the distance between the third lens L31 and the fourth lens L41 and the overall length. When (T34/OAL) is less than the lower limit of Inequality 1, a space where the moving lens group LM1 is movable is difficult to be secured. When (T34/OAL) is greater than the upper limit of Inequality 1, it is difficult to secure a resolving power, and an optical lens system may be enlarged.

Inequality 2 limits an Abbe number ratio between the second lens L21 and the third lens L31. When Inequality 2 is satisfied, chromatic aberration may be effectively corrected.

The optical lens assembly according to various embodiments may satisfy the following inequality.

$$2 \le f2/f < -0.8 \qquad \text{<Inequality 3>}$$

In Inequality 3, f indicates the focal length of the optical lens assembly, and f2 indicates the focal length of the second lens.

When (f2/f) is less than the lower limit of Inequality 3, the focal length of the second lens increases, making it difficult to make a slimmer optical lens assembly. When (f2/f) is greater than the upper limit of Inequality 3, the focal length of the second lens decreases, and thus manufacturing sensitivity of the optical lens assembly may be increased.

The optical lens assembly according to various embodiments may satisfy the following inequality.

$$0 \le f_{IR} < 300 \qquad \text{<Inequality 4>}$$

In Inequality 4, $f_{IR}$ indicates the focal length of the moving lens group. When the moving lens group satisfies Inequality 4, a focus difference according to object distances and the wavelength of light may be easily corrected. For example, the focal length of the moving lens group may be greater than 0 and less than 200. For example, the focal length of the moving lens group may be greater than 0 and less than 100.

As described above, the optical lens assembly according to various embodiments may correct a focus difference that is generated in a visible light region and an IR light region in a fixed focus lens system, by using the moving lens group.

An aspherical surface used in the optical lens assembly according to various embodiments is defined as follows.

An aspherical shape may be expressed as in the following equation, by making a traveling direction of light be positive when the direction of the optical axis is set to be an axis x and a direction perpendicular to the direction of the optical axis is set to be an axis y. In the following equation, x denotes a distance from a vertex of a lens in the direction of the optical axis, y denotes a distance from the vertex of the lens in the direction perpendicular to the optical axis, K denotes a conic constant, A, B, C, and D denote aspherical coefficients, and c denotes a reciprocal (1/R) of the radius of curvature at the vertex of the lens.

$$x = \frac{cy^2}{1 + \sqrt{1 - (K+1)c^2 y^2}} + Ay^4 + By^6 + Cy^8 + Dy^{10} + \ldots \qquad \text{< Inequality 5 >}$$

In the present disclosure, an optical lens assembly may be realized via the following numerical embodiments based on various designs.

In each of the numerical embodiments, lens surface numbers (1, 2, 3, . . . , and Sn; n is a natural number) are sequentially allotted in series from the object side O toward the image side I. In each of the numerical embodiments, f denotes the focal length of the optical lens assembly, R denotes the radius of curvature, Dn denotes the thickness of the center of a lens or an air gap between lenses, nd denotes a refractive index, and vd denotes the Abbe number. In each of the numerical embodiments, ST denotes a stop, obj denotes an object, and * denotes that the surface is an aspherical surface.

First Numerical Embodiment

FIG. 1 illustrates the moving lens group LM1 moved to deviate from the optical axis OA in the optical lens assembly according to the first numerical embodiment, according to various embodiments. Table 1 shows design data in the case where the moving lens group LM1 has been moved to deviate from the optical axis OA. In the first numerical embodiment, F-number is 2.08, a half field of view is 36.7°, and an overall focal length (f) is 3.75 mm.

TABLE 1

| LENS SURFACE | R | Dn | nd | vd |
|---|---|---|---|---|
| obj | infinity | 500 | | |
| 1* | 1.448772 | 0.69965 | 1.5441 | 56.09 |
| 2* | −75.000000 | 0.02608 | | |
| 3* | 12.062602 | 0.18500 | 1.66066 | 20.37 |
| 4* | 2.808659 | 0.13480 | | |
| ST | infinity | 0.22463 | | |
| 6* | −2.916821 | 0.36006 | 1.5441 | 56.09 |
| 7* | −2.577090 | 0.69622 | | |
| 8* | −17.113075 | 0.40000 | 1.66066 | 20.37 |
| 9* | 7.947845 | 0.06919 | | |
| 10* | 1.677608 | 0.85334 | 1.5441 | 56.09 |
| 11* | 1.385358 | 0.22607 | | |
| 12 | infinity | 0.11000 | 1.5168 | 64.2 |
| 13 | infinity | 0.52500 | | |
| IMG | infinity | 0.00000 | | |

FIG. 2 illustrates the moving lens group LM1 moved between the third lens L31 and the fourth lens L41 in the optical lens assembly according to the first numerical embodiment, according to various embodiments. Table 2 shows design data in the case where the moving lens group LM1 has been moved between the third lens L31 and the fourth lens L41. The lens surfaces of the moving lens group LM1 are indicated by reference numerals 7-1, 7-2, 7-3, and 7-4.

TABLE 2

| LENS SURFACE | R | Dn | nd | vd |
|---|---|---|---|---|
| obj | infinity | 500 | | |
| 1* | 1.448772 | 0.69965 | 1.5441 | 56.09 |
| 2* | −75.000000 | 0.02608 | | |
| 3* | 12.062602 | 0.18500 | 1.66066 | 20.37 |
| 4* | 2.808659 | 0.13480 | | |
| ST | infinity | 0.22463 | | |
| 6* | −2.916821 | 0.36006 | 1.5441 | 56.09 |
| 7 (7*-1) | −2.577090 | 0.1 | | |
| 7-2 | infinity | 0.2 | 1.50858 | 61.34 |
| 7-3 | infinity | 0.04 | 1.52652 | 23.14 |
| 7-4 | −26.08 | 0.356 | | |
| 8* | −17.113075 | 0.40000 | 1.66066 | 20.37 |
| 9* | 7.947845 | 0.06919 | | |
| 10* | 1.677608 | 0.85334 | 1.5441 | 56.09 |
| 11* | 1.385358 | 0.22607 | | |
| 12 | infinity | 0.11000 | 1.5168 | 64.2 |
| 13 | infinity | 0.52500 | | |
| IMG | infinity | 0.00000 | | |

Table 3 shows aspherical coefficients in the first numerical embodiment.

TABLE 3

| | 1 | 2 | 3 | 4 | 6 | 7 | 8 | 9 | 10 | 11 |
|---|---|---|---|---|---|---|---|---|---|---|
| K | −0.29816 | 0 | 161.8321 | 2.529586 | 4.593495 | 1.651936 | 0 | 11.20482 | −2.87574 | −1.59931 |
| A | −0.00122 | 0.002503 | 0.001865 | 0.00854 | −0.12561 | −0.07836 | 0.187254 | −0.11761 | −0.49754 | −0.27104 |
| B | 0.06328 | −0.10266 | 0.066364 | 0.095967 | −0.10998 | 0.006897 | −0.40048 | 0.272346 | 0.601848 | 0.199799 |
| C | −0.16489 | 0.883566 | 0.010106 | −0.16539 | 0.230944 | −0.42787 | 0.588706 | −0.32738 | −0.50656 | −0.10999 |
| D | 0.197272 | −3.33036 | −0.24027 | 0.230614 | −0.62372 | 1.700558 | −0.6809 | 0.190922 | 0.27337 | 0.040246 |
| E | −0.0627 | 6.168835 | 0.223814 | 0 | 0.685199 | −3.30279 | 0.502998 | −0.06027 | −0.09122 | −0.00929 |
| F | −0.10816 | −6.46666 | 0.004225 | 0 | 0 | 3.797863 | −0.22089 | 0.009691 | 0.018263 | 0.001289 |
| G | 0.086789 | 3.667414 | 0 | 0 | 0 | −2.36859 | 0.052122 | −0.00054 | −0.00201 | −9.77E−05 |
| H | −0.02536 | −0.87109 | 0 | 0 | 0 | 0.65336 | −0.00504 | −1.98E−05 | 9.38E−05 | 3.10E−06 |

Figure 3:
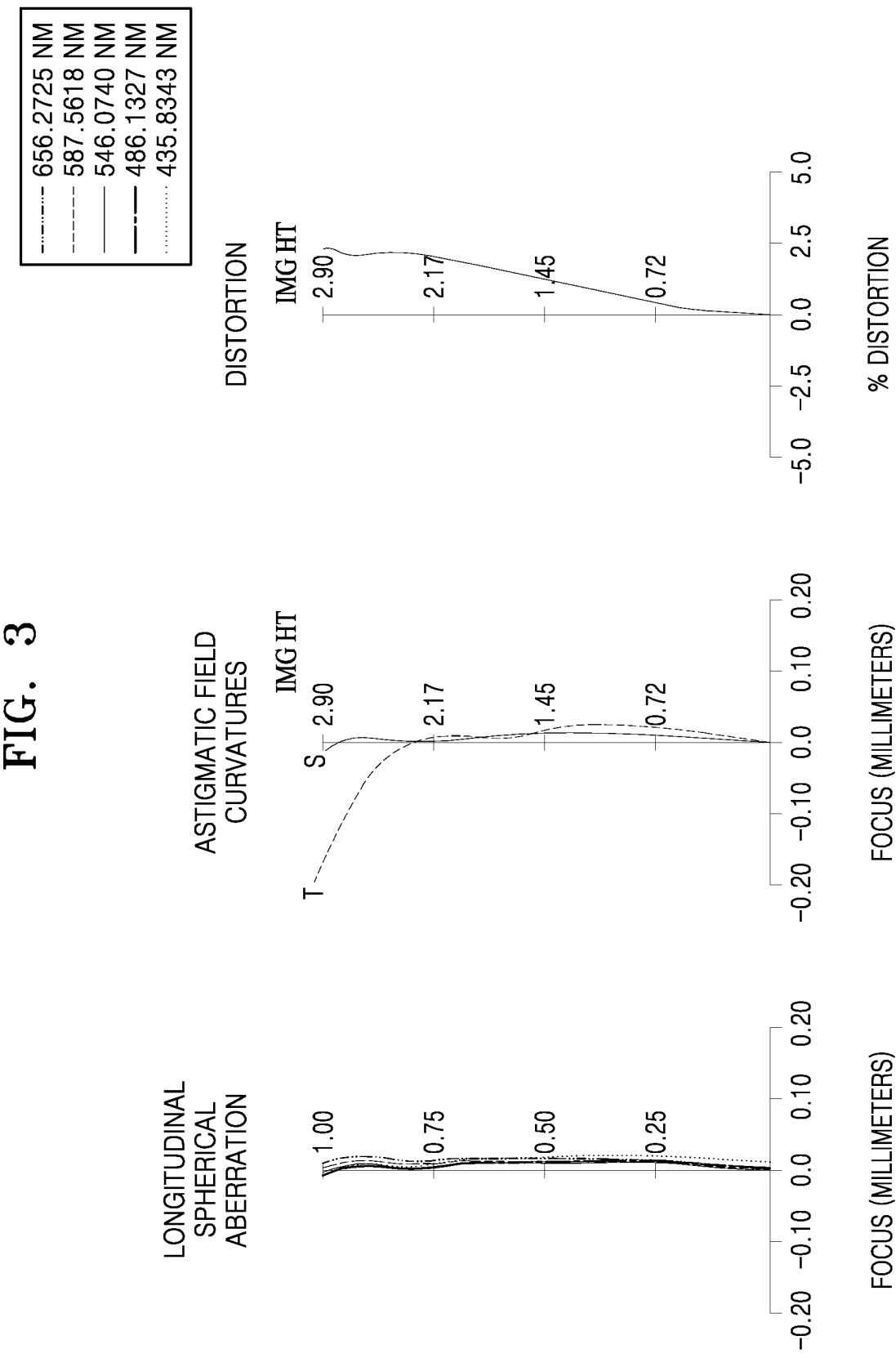
FIG. 3 is an aberration diagram of the optical lens assembly according to the first numerical embodiment of FIG. 1.

FIG. 3 illustrates a longitudinal spherical aberration, astigmatic field curves, and distortion when the moving lens group LM1 has been moved to deviate from the optical axis OA in the optical lens assembly according to the first numerical embodiment of the present disclosure. The longitudinal spherical aberration shows aberration with respect to visible light, for example, light at wavelengths of 656.2725 NM (nanometer), 587.5618 NM, 546.0740 NM, 486.1327 NM, and 435.8343 NM. A tangential field curvature T and a sagittal field curvature S are shown in the astigmatic field curves. The astigmatic field curves are shown with respect to light at a wavelength of 587.5618 NM, and the distortion is shown with light at a wavelength of 587.5618 NM.

Figure 4:
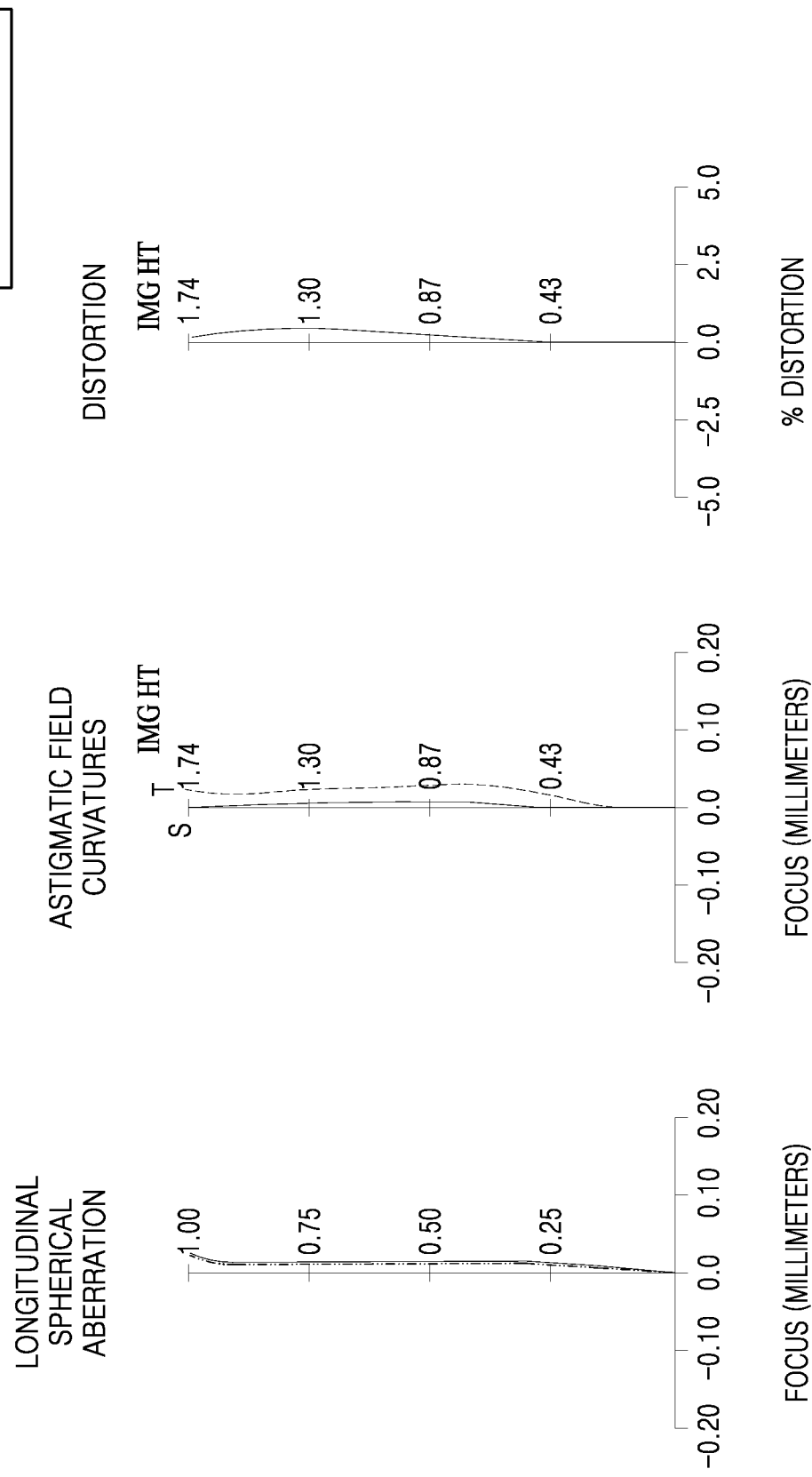
FIG. 4 is an aberration diagram of the optical lens assembly according to the first numerical embodiment of FIG. 2.

FIG. 4 illustrates a longitudinal spherical aberration, astigmatic field curves, and distortion when the moving lens group LM1 has been moved to be located on the optical axis OA in the optical lens assembly according to the first numerical embodiment of the present disclosure. The longitudinal spherical aberration shows aberration with respect to IR light, for example, light at wavelengths of 840.0000 NM, 820.0000 NM, and 800.0000 NM, the astigmatic field curves are shown with respect to light at a wavelength of 820.0000 NM, and the distortion is shown with light at a wavelength of 820.0000 NM.

Second Numerical Embodiment

FIG. 5 illustrates the moving lens group LM2 moved to deviate from the optical axis OA in the optical lens assembly 100-2 according to the second numerical embodiment, according to various embodiments. Table 4 shows design data in the case where the moving lens group LM2 has been moved to deviate from the optical axis OA. In the second numerical embodiment, F-number is 2.05, a half field of view is 37°, and a focal length (f) is 3.7 mm.

TABLE 4

| LENS SURFACE | R | Dn | nd | vd |
|---|---|---|---|---|
| obj | infinity | 500 | | |
| 1* | 1.442 | 0.746 | 1.5441 | 56.09 |
| 2* | 23.798 | 0.055 | | |
| 3* | 25.839 | 0.19 | 1.66066 | 20.37 |
| 4* | 3.113 | 0.097 | | |
| ST | infinity | 0.248 | | |
| 6* | −5.572 | 0.398 | 1.5441 | 56.09 |
| 7* | −3.175 | 0.69 | | |
| 8* | −100 | 0.43 | 1.63493 | 23.89 |
| 9* | 7.134 | 0.088 | | |
| 10* | 1.337 | 0.652 | 1.5348 | 55.71 |

TABLE 4-continued

| LENS SURFACE | R | Dn | nd | vd |
|---|---|---|---|---|
| 11* | 1.112 | 0.226 | | |
| 12 | infinity | 0.11 | 1.5168 | 64.2 |
| 13 | infinity | 0.53 | | |
| IMG | infinity | 0 | | |

FIG. 6 illustrates the moving lens group LM2 moved between the third lens L32 and the fourth lens L42 in the optical lens assembly according to the second numerical embodiment, according to various embodiments. Table 5 shows design data in the case where the moving lens group LM2 has been moved between the third lens L32 and the fourth lens L42. The lens surfaces of the moving lens group LM2 are indicated by reference numerals 7-1, 7-2, and 7-3.

TABLE 5

| LENS SURFACE | R | Dn | nd | vd |
|---|---|---|---|---|
| obj | infinity | 500 | | |
| 1* | 1.442 | 0.746 | 1.5441 | 56.09 |
| 2* | 23.798 | 0.055 | | |
| 3* | 25.839 | 0.19 | 1.66066 | 20.37 |
| 4* | 3.113 | 0.097 | | |
| ST | infinity | 0.248 | | |
| 6* | −5.572 | 0.398 | 1.5441 | 56.09 |
| 7* (7*-1) | −3.175 | 0.1 | | |
| 7*-2 | −300 | 0.2 | 1.66066 | 20.37 |
| 7*-3 | −28.3 | 0.39 | | |
| 8* | −100 | 0.43 | 1.63493 | 23.89 |
| 9* | 7.134 | 0.088 | | |
| 10* | 1.337 | 0.652 | 1.5348 | 55.71 |
| 11* | 1.112 | 0.226 | | |
| 12 | infinity | 0.11 | 1.5168 | 64.2 |
| 13 | infinity | 0.53 | | |
| IMG | infinity | 0 | | |

Table 6 shows aspherical coefficients in the second numerical embodiment.

TABLE 6

| | 1 | 2 | 3 | 4 | 5 | 6 | 7 | 8 | 9 | 10 |
|---|---|---|---|---|---|---|---|---|---|---|
| K | −0.24981 | 0.00000 | 866.11238 | 2.55416 | 44.90290 | 5.63288 | 0.00000 | −495.89279 | −2.02503 | −0.95362 |
| A | 0.00264 | −0.05571 | −0.07242 | 0.00649 | −0.15115 | −0.09643 | 0.18215 | −0.08441 | −0.65026 | −0.43034 |
| B | 0.04532 | −0.01698 | 0.30083 | 0.01282 | 0.18332 | 0.01857 | −0.38265 | 0.25930 | 0.73976 | 0.31559 |
| C | −0.12927 | 0.81110 | −0.57081 | 1.11083 | −3.24955 | −0.74426 | 0.57221 | −0.32594 | −0.61935 | −0.18128 |
| D | 0.18378 | −3.19963 | 1.48332 | −5.48523 | 20.64550 | 3.02286 | −0.67440 | 0.19202 | 0.33027 | 0.06897 |
| E | −0.09365 | 6.10651 | −4.00028 | 13.55278 | −74.07919 | −6.52389 | 0.50425 | −0.06039 | −0.10663 | −0.01655 |
| F | −0.06702 | −6.46612 | 6.91616 | −18.13590 | 152.09742 | 8.11745 | −0.22163 | 0.00962 | 0.02035 | 0.00239 |
| G | 0.08632 | 3.66742 | −6.00774 | 13.04688 | −168.35794 | −5.56424 | 0.05185 | −0.00054 | −0.00212 | −0.00019 |
| H | −0.02785 | −0.87109 | 2.05295 | −3.84162 | 78.59481 | 1.66867 | −0.00495 | −0.00001 | 0.00009 | 0.00001 |

Table 7 shows aspherical coefficients of the moving lens group LM2 in the second numerical embodiment.

TABLE 7

| | 7-2 | 7-3 | |
|---|---|---|---|
| K | 0 | 0 | |
| A | −0.00949 | 0.07328 | |
| B | 0.25234 | −0.80433 | |
| C | −1.46325 | 4.75391 | |
| D | 4.01242 | −16.59415 | |
| E | −6.14395 | 34.98712 | |
| F | 5.65309 | −44.57067 | |
| G | −3.15798 | 33.19421 | |
| H | 0.96485 | −13.12334 | |
| K | −0.12253 | 2.07564 | |

Figure 7:
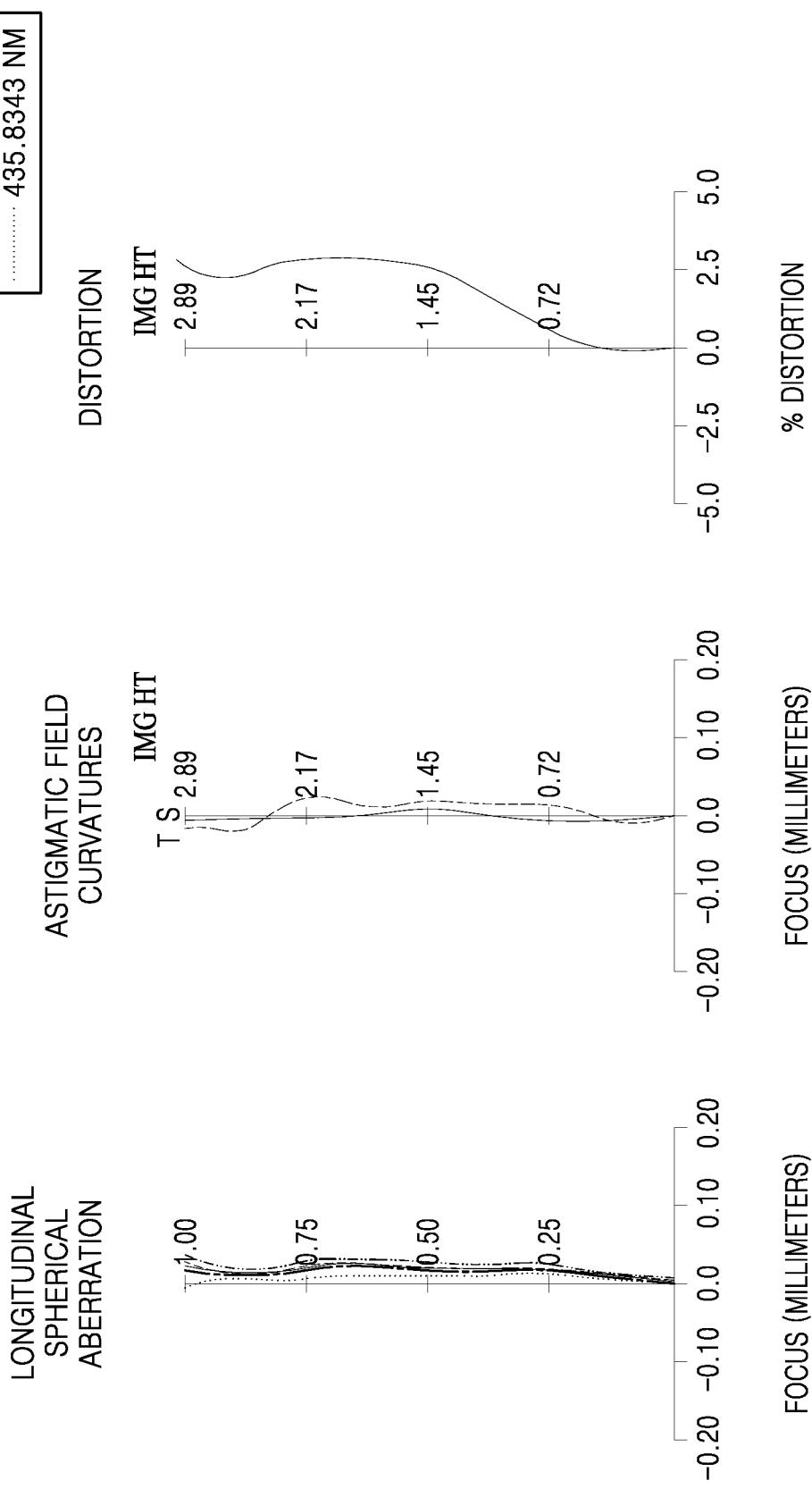
FIG. 7 is an aberration diagram of the optical lens assembly according to the second numerical embodiment of FIG. 5.
Figure 8:
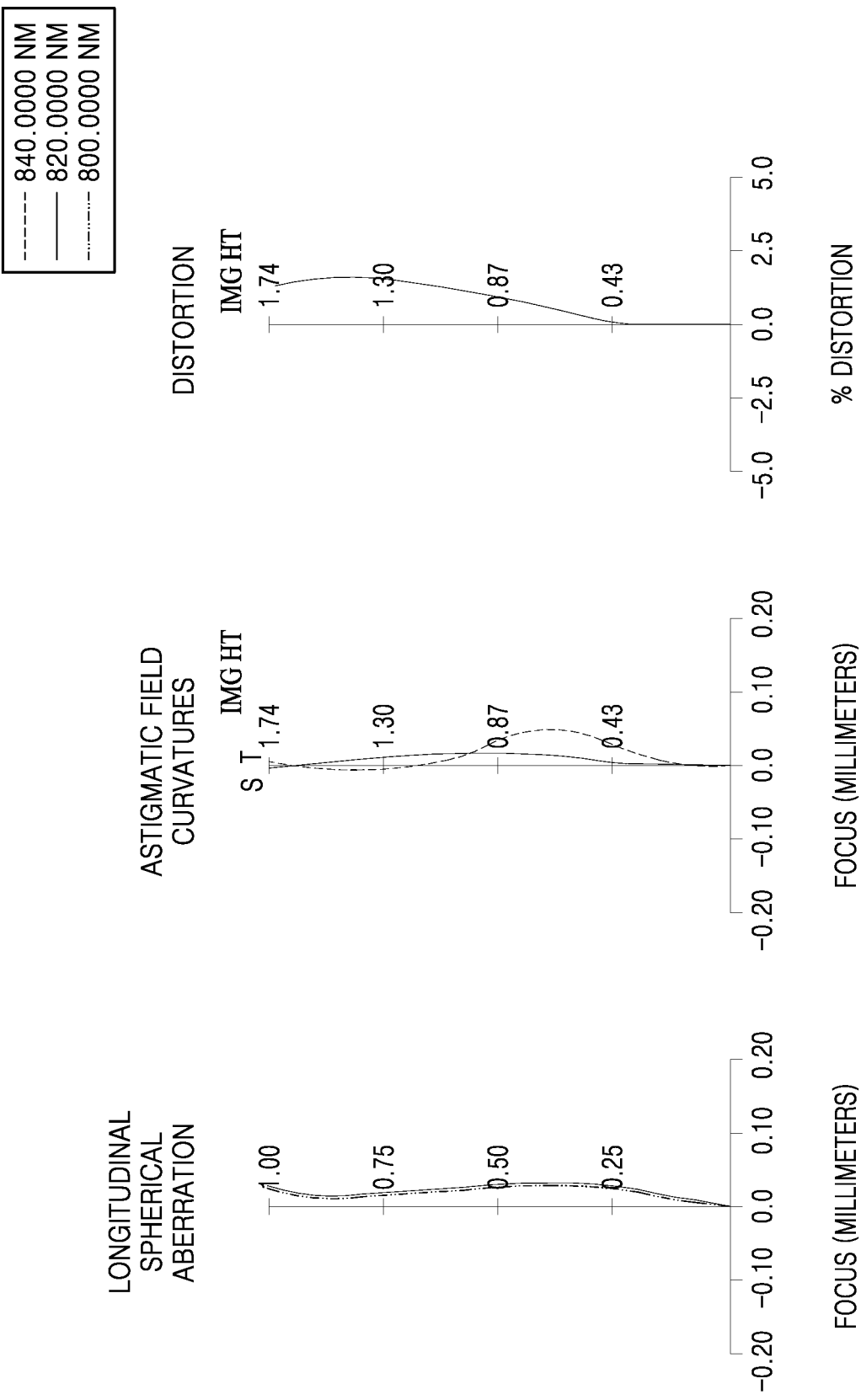
FIG. 8 is an aberration diagram of the optical lens assembly according to the second numerical embodiment of FIG. 6.

FIG. 7 illustrates a longitudinal spherical aberration, astigmatic field curves, and distortion when the moving lens group has been moved to deviate from the optical axis in the optical lens assembly according to the second numerical embodiment of the present disclosure. FIG. 8 illustrates a longitudinal spherical aberration, astigmatic field curves, and distortion when the moving lens group has been moved to be located on the optical axis in the optical lens assembly according to the second numerical embodiment of the present disclosure.

Third Numerical Embodiment

FIG. 9 illustrates the moving lens group LM3 moved to deviate from the optical axis OA in the optical lens assembly 100-3 according to the third numerical embodiment, according to various embodiments. Table 8 shows design data in the case where the moving lens group LM3 has been moved to deviate from the optical axis OA. In the third numerical embodiment, F-number is 2.05, a half field of view is 36.5°, and a focal length (f) is 3.79 mm.

TABLE 8

| LENS SURFACE | R | Dn | nd | vd |
|---|---|---|---|---|
| obj | infinity | 500 | | |
| 1* | 1.383975 | 0.771 | 1.5441 | 56.09 |
| 2* | 75.016256 | 0.037 | | |
| 3* | 17.940384 | 0.19 | 1.66066 | 20.37 |
| 4* | 2.776532 | 0.098 | | |
| ST | infinity | 0.288 | | |
| 6* | −6.254113 | 0.367 | 1.5441 | 56.09 |
| 7* | −5.164688 | 0.635 | | |
| 8* | −2798.645245 | 0.43 | 1.63493 | 23.89 |
| 9* | 8.383211 | 0.08 | | |
| 10* | 1.530f377 | 0.72 | 1.5348 | 55.71 |
| 11* | 1.283585 | 0.204 | | |

TABLE 8-continued

| LENS SURFACE | R | Dn | nd | vd |
|---|---|---|---|---|
| 12 | infinity | 0.11 | 1.5168 | 64.2 |
| 13 | infinity | 0.531 | | |
| IMG | infinity | 0 | | |

FIG. 10 illustrates the moving lens group LM3 moved to be located between the third lens L33 and the fourth lens L43 in the optical lens assembly 100-3 according to the third numerical embodiment, according to various embodiments. Table 9 shows design data in the case where the moving lens group LM3 has been moved to be located between the third lens L33 and the fourth lens L43. The lens surfaces of the moving lens group LM3 are indicated by reference numerals 7-1, 7-2, 7-3, and 7-4.

TABLE 9

| LENS SURFACE | R | Dn | nd | vd |
|---|---|---|---|---|
| obj | infinity | 500 | | |
| 1* | 1.383975 | 0.771 | 1.5441 | 56.09 |
| 2* | 75.016256 | 0.037 | | |
| 3* | 17.940384 | 0.19 | 1.66066 | 20.37 |
| 4* | 2.776532 | 0.098 | | |
| ST | infinity | 0.288 | | |
| 6* | −6.254113 | 0.367 | 1.5441 | 56.09 |
| 7* (7*-1) | −5.164688 | 0.095 | | |
| 7-2 | infinity | 0.2 | 1.80518 | 25.46 |
| 7-3 | infinity | 0.04 | 1.52652 | 23.14 |
| 7-4 | −20.640000 | 0.3 | | |

TABLE 9-continued

| LENS SURFACE | R | Dn | nd | vd |
|---|---|---|---|---|
| 8* | −2798.645245 | 0.43 | 1.63493 | 23.89 |
| 9* | 8.383211 | 0.08 | | |
| 10* | 1.530377 | 0.72 | 1.5348 | 55.71 |
| 11* | 1.283585 | 0.204 | | |
| 12 | infinity | 0.11 | 1.5168 | 64.2 |
| 13 | infinity | 0.531 | | |
| IMG | infinity | 0 | | |

Table 10 shows aspherical coefficients in the third numerical embodiment.

TABLE 10

| | 1 | 2 | 3 | 4 | 5 | 6 | 7 | 8 | 9 | 10 |
|---|---|---|---|---|---|---|---|---|---|---|
| K | 1.38398 | 75.01626 | 17.94038 | 2.77653 | −6.25411 | −5.16469 | −2798.64525 | 8.38321 | 1.53038 | 1.28358 |
| A | −0.21595 | 0.00000 | 435.79385 | 1.83372 | 44.88890 | 8.70634 | 0.00000 | −708.54020 | −1.88069 | −1.20070 |
| B | 0.00926 | −0.01008 | −0.04296 | 0.00517 | −0.09829 | −0.11473 | 0.18713 | −0.08311 | −0.62288 | −0.34662 |
| C | 0.03210 | −0.02222 | 0.24882 | −0.03918 | −1.26980 | −0.02588 | −0.39123 | 0.25910 | 0.73369 | 0.24888 |
| D | −0.10808 | 0.77234 | −0.52683 | 1.18223 | 9.96683 | −0.40347 | 0.57518 | −0.32733 | −0.62994 | −0.13307 |
| E | 0.18076 | −3.17551 | 1.45150 | −5.43343 | −46.64552 | 1.67736 | −0.67492 | 0.19202 | 0.34085 | 0.04507 |
| F | −0.09753 | 6.10651 | −4.00028 | 13.55275 | 127.10684 | −3.31555 | 0.50390 | −0.06027 | −0.11145 | −0.00908 |
| G | −0.06667 | −6.46611 | 6.91617 | −18.13601 | −199.42893 | 3.79647 | −0.22152 | 0.00965 | 0.02155 | 0.00099 |
| H | 0.08632 | 3.66741 | −6.00773 | 13.04688 | 165.81368 | −2.37269 | 0.05191 | −0.00054 | −0.00228 | −0.00005 |

Figure 11:
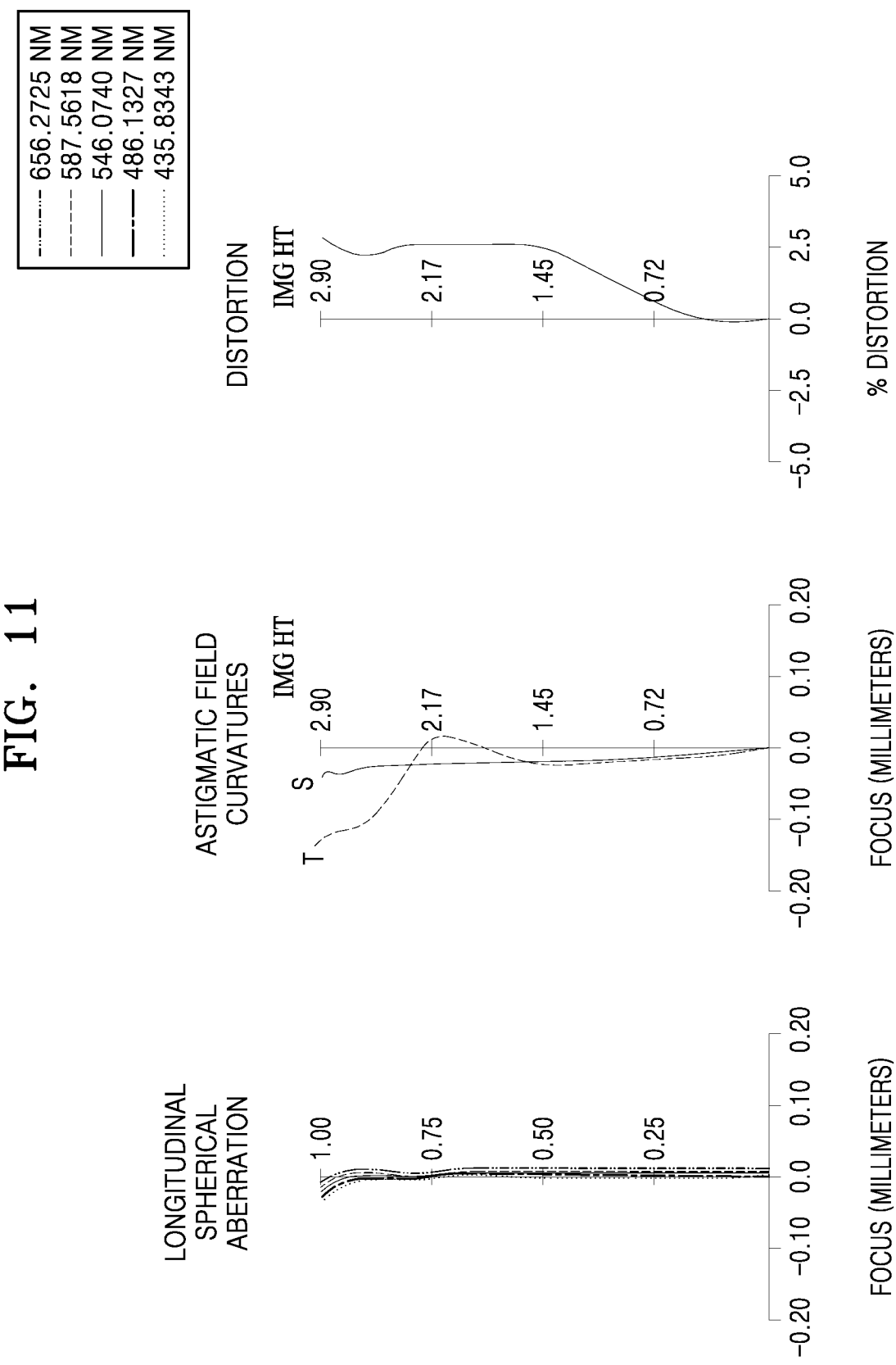
FIG. 11 is an aberration diagram of the optical lens assembly according to the third numerical embodiment of FIG. 9.
Figure 12:
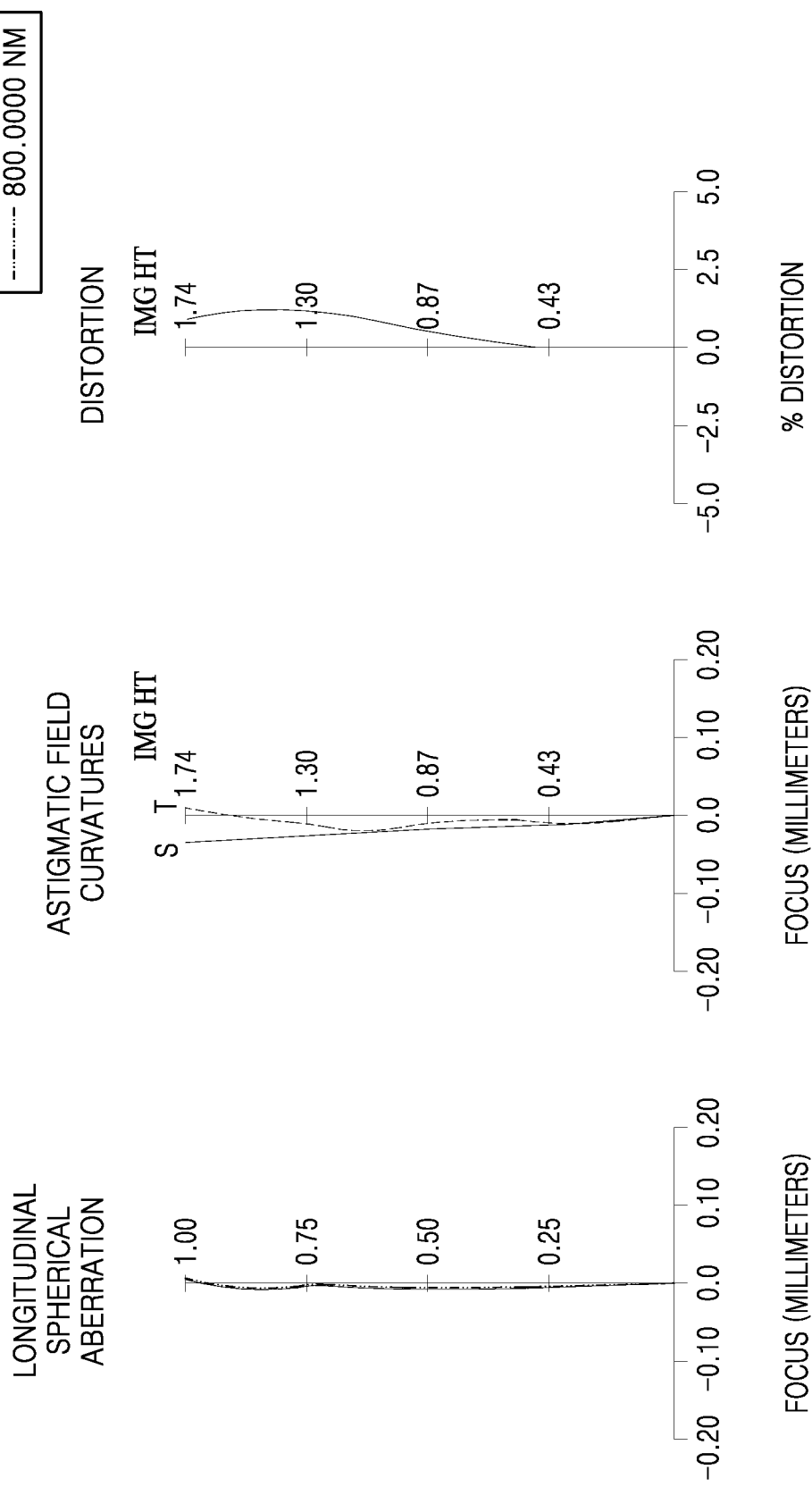
FIG. 12 is an aberration diagram of the optical lens assembly according to the third numerical embodiment of FIG. 10.

FIG. 11 illustrates a longitudinal spherical aberration, astigmatic field curves, and distortion when the moving lens group has been moved to deviate from the optical axis in the optical lens assembly according to the third numerical embodiment of the present disclosure. FIG. 12 illustrates a longitudinal spherical aberration, astigmatic field curves, and distortion when the moving lens group has been moved to be located on the optical axis in the optical lens assembly according to the third numerical embodiment of the present disclosure.

Figure 13:
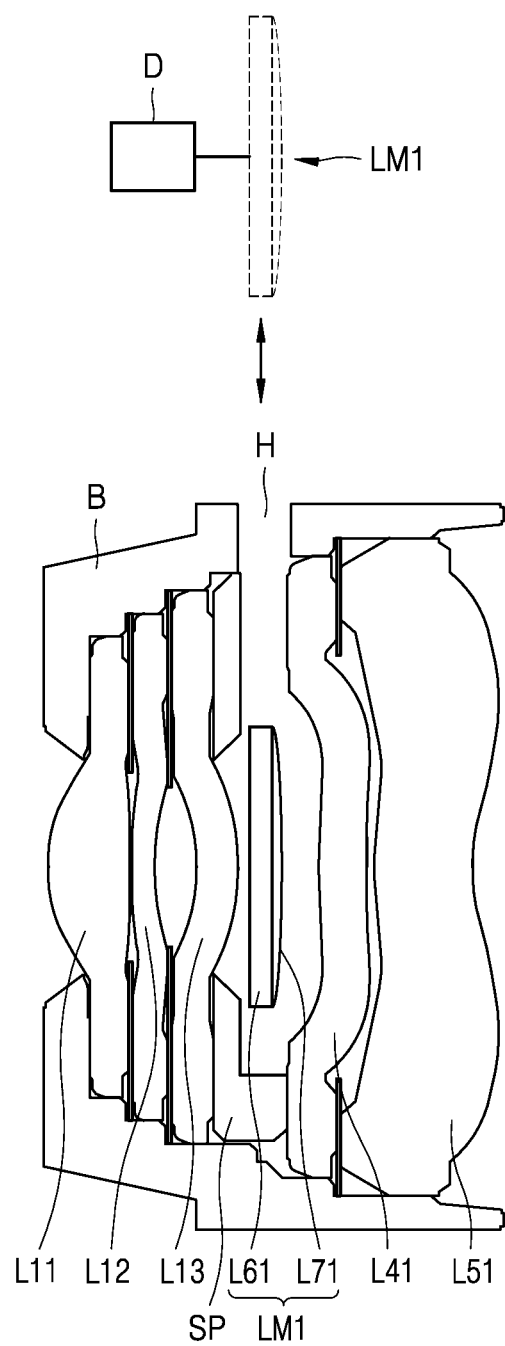
FIG. 13 illustrates a structure when a moving lens group of an optical lens assembly according to various embodiments moves.

FIG. 13 is a view for explaining a structure when the moving lens group LM1 moves in an optical lens assembly according to various embodiments. The lenses included in the optical lens assembly may be included in a lens barrel B. The optical lens assembly will now be described by illustrating the first numerical embodiment. The lens barrel B may have a hole through which the moving lens group LM1 may enter. An actuator D that moves the moving lens group LM1 may be included. Reference character SP indicates a spacer.

Table 11 below shows several data of the optical lens assembly according to various embodiments, and also shows that Inequalities 1 through 4 are satisfied.

may perform user authentication via iris photography performed by a user in a photographing mode in an IR region. The optical lens assembly according to various embodiments may correct a focus difference that is generated during visible light photography and IR photography in a high-pixel fixed focus lens system, by using the moving lens group.

The optical lens assembly according to various embodiments may be suitable for ultra-small optical apparatuses mounted on mobile apparatuses, and may adjust the radius of curvature of a lens surface of each of the lenses included in the optical lens assembly and may be manufactured to have aspherical lenses, thereby reducing various types of aberration and obtaining high-resolution bright images.

The optical lens assembly according to various embodiments proposes an efficient method of implementing a camera lens system for iris recognition in an electronic apparatus. General lens systems for image photography may have difficulties in iris image capturing due to an influence of natural light, and may provide decreased utility because of a reduction in the size of an iris image due to a small magnification. The optical lens assembly according to various embodiments may capture high quality iris images by applying an IR pass coating (or a visible light block coating) and an IR light source. In addition, the optical lens assembly according to various embodiments may secure sufficient transverse magnification to thereby ensure satisfactory recognition performance. Moreover, the optical lens assembly according to various embodiments may have a miniaturized size and thus may be used in, for example, mobile electronic apparatuses.

The optical lens assembly according to various embodiments is applicable to, for example, electronic apparatuses employing an image sensor. An optical lens assembly according to an embodiment is applicable to various electronic apparatuses such as digital cameras, cameras with

TABLE 11

| | F | f1 | f2 | f3 | f4 | f5 | HALF FILED OF VIEW | OAL | Fnumber | T34 | V3 − V2 | f2/f | T34/ OAL | $f_{IR}$ |
|---|---|---|---|---|---|---|---|---|---|---|---|---|---|---|
| EMBODIMENT 1 | 3.75 | 2.6 | −5.5 | 29.5 | −11.1 | 457.3 | 37 | 4.51 | 2.08 | 0.696 | 35.7 | −1.47 | 0.154 | 49.6 |
| EMBODIMENT 2 | 3.69 | 2.8 | −5.3 | 12.8 | −10.4 | 1013.6 | 37 | 4.46 | 2.05 | 0.69 | 35.7 | −1.44 | 0.154 | 48.9 |
| EMBODIMENT 3 | 3.82 | 2.6 | −4.9 | 48.5 | −13.0 | 767.7 | 36 | 4.46 | 2.06 | 0.635 | 35.7 | −1.28 | 0.142 | 39 |

The optical lens assembly according to various embodiments may secure an optical performance even in a visible light region without special focusing by inserting or removing a moving lens group for IR photography into or from a lens group for visible-light photography. For example, the optical lens assembly according to various embodiments replaceable lenses, video cameras, cellphone cameras, cameras for small mobile apparatuses.

Figure 14:
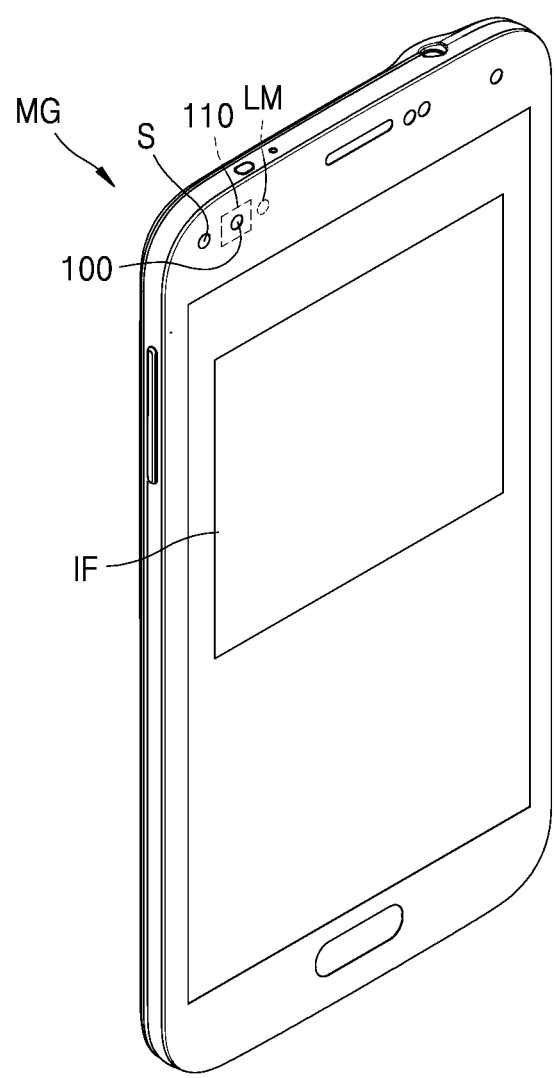
FIG. 14 illustrates an example of an electronic apparatus including an optical lens assembly according to various embodiments.
Figure 17:
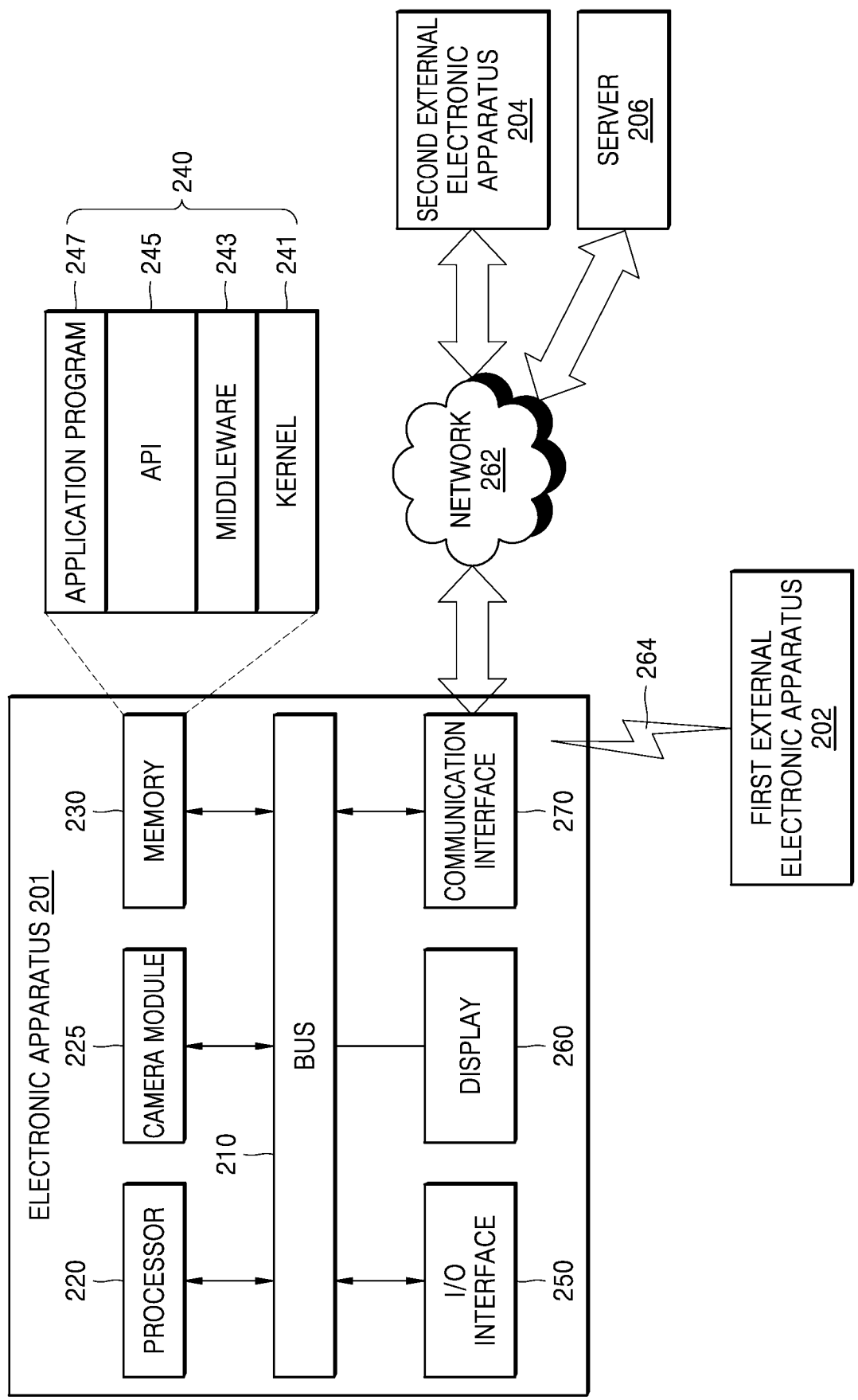
FIG. 17 is a block diagram of a network environment system according to various embodiments.
Figure 18:
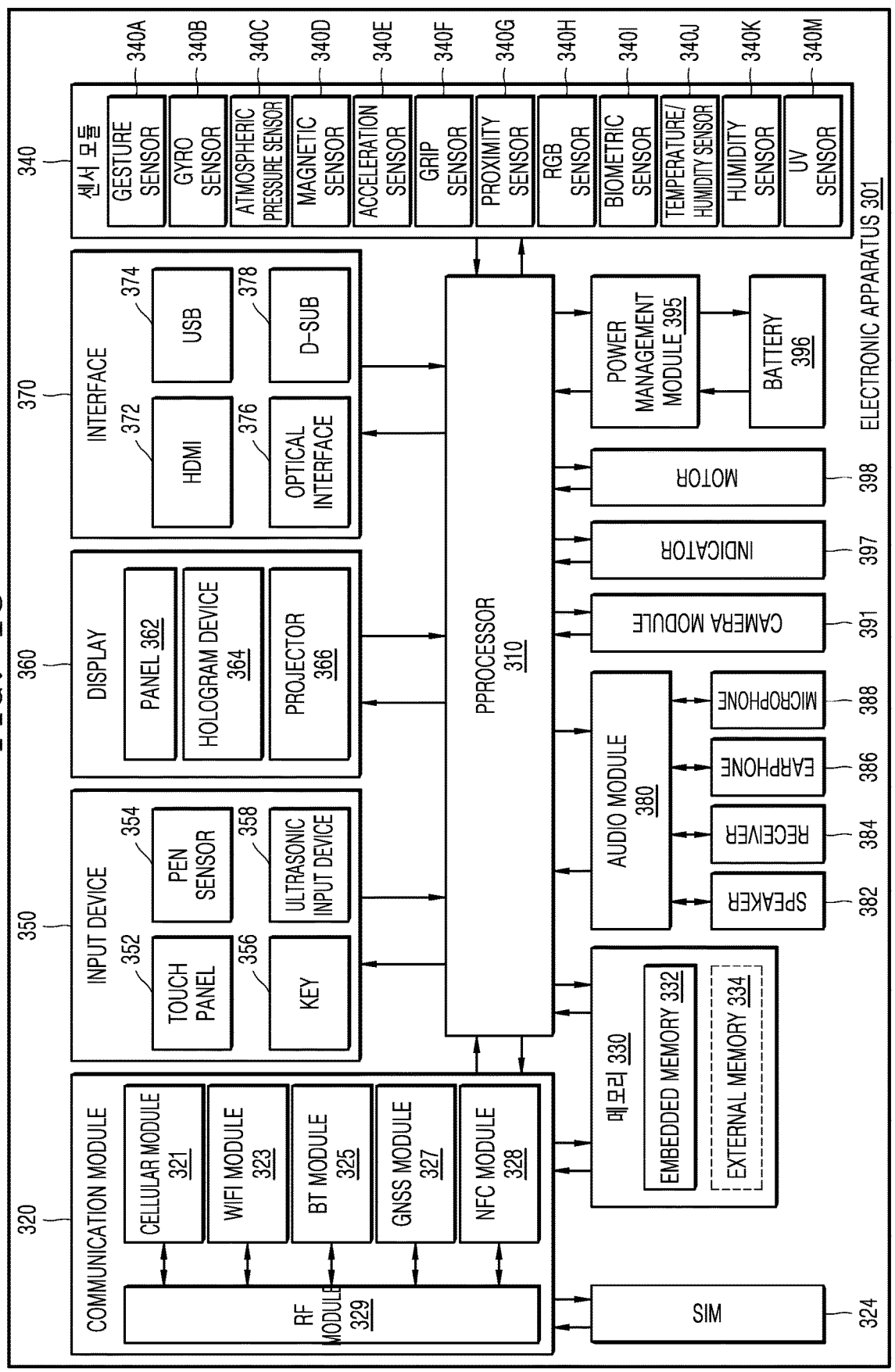
FIG. 18 is a block diagram of an electronic apparatus according to various embodiments.

FIG. 14 illustrates an electronic apparatus MG including an optical lens assembly according to an embodiment (for example, an electronic apparatus 201 of FIG. 17 or an electronic apparatus 301 of FIG. 18). Although FIG. 14 illustrates a case where the electronic apparatus MG is a mobile phone, embodiments are not limited thereto. The electronic apparatus MG may include at least one optical lens assembly 100, and an image sensor 110 for receiving images formed by the optical lens assembly 100 and converting the images into electric image signals. The optical lens assembly 100 according to various embodiments may include a moving lens group LM. The optical lens assembly 100 may be one of the optical lens assemblies described above with reference to FIGS. 1 through 13. The moving lens group LM may be, for example, the moving lens group LM1 of FIG. 1, the moving lens group LM2 of FIG. 5, or the moving lens group LM3 of FIG. 9. Photographing apparatuses of high performance may be implemented by applying the optical lens assembly according to various embodiments to electronic apparatuses such as small digital cameras, mobile phones, and authentication apparatuses. The electronic apparatus MG may further include an IR light source S that radiates IR light during IR photography. The IR light source S may be disposed adjacent to the optical lens assembly 100. IR light radiated from the IR light source S is reflected by the eyes of a user, and the reflected IR light may be focused on the image sensor 110 via the optical lens assembly 100. The electronic apparatus MG according to various embodiments may obtain iris images precisely by using the IR light source and the optical lens assembly having the moving lens. The image sensor 110 may further include IR-sensitive pixels. The IR-sensitive pixels may allow images of the irises of the user to be captured accurately.

When iris authentication of the user is performed, a user interface IF for guiding user authentication (for example, an input/output (I/O) interface 250 of FIG. 17 or an interface 370 of FIG. 18) may be displayed on a display screen of the electronic apparatus MG. The IR light radiated from the IR light source S is reflected by the eyes of a user, and the reflected IR light may be focused on the image sensor 110 via the optical lens assembly 100.

The optical lens assembly according to various embodiments is applicable to user authentication via iris recognition of a user. Iris recognition is one of biometric techniques that are based on the fact that users have unique iris patterns. When used for iris recognition, the viewing angle (or the focal length) of the optical lens assembly has to be wide enough or long enough to ensure photography of both eyes of the user at arm's length of the user. Doing so allows an electronic apparatus to perform iris recognition during normal operations of the electronic apparatus.

Figure 15:
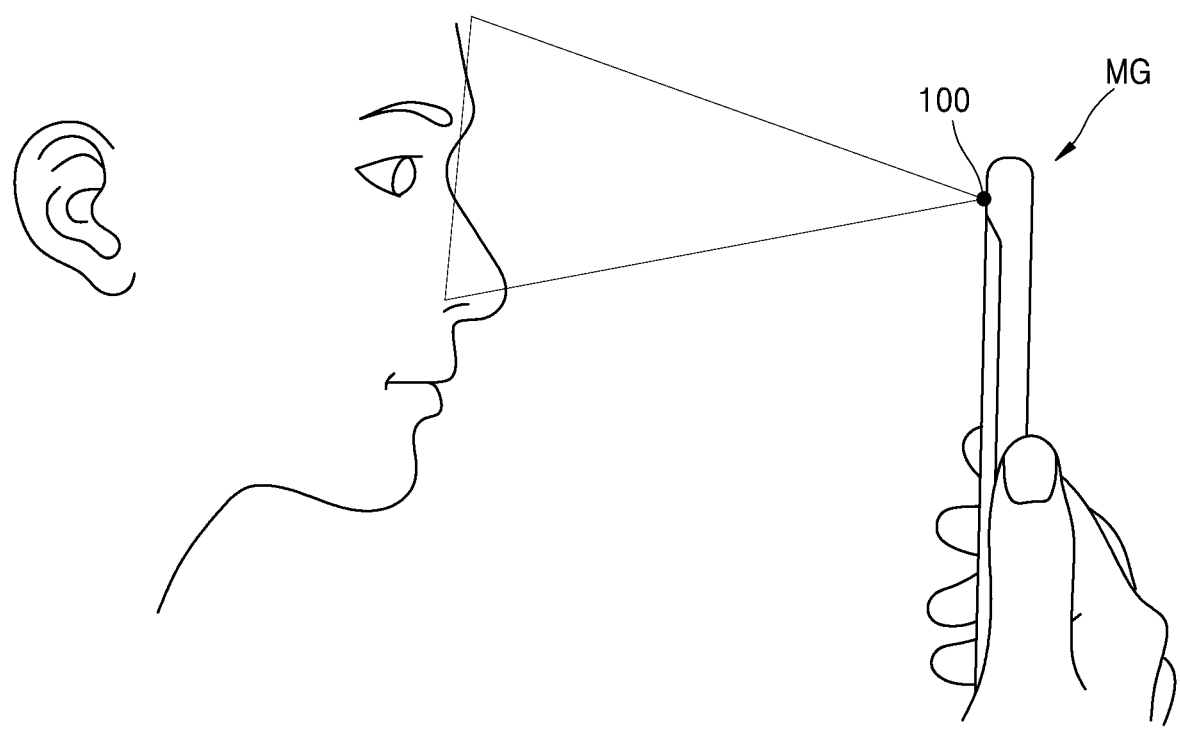
FIG. 15 is a view illustrating an example of using an optical lens assembly according to various embodiments.

When the electronic apparatus MG performs iris authentication of the user by using the optical lens assembly 100 according to various embodiments and the image sensor 110, the user interface IF for guiding user authentication may be displayed on the display screen of the electronic apparatus MG, and the mode of the electronic apparatus MG may be converted into an IR photographing mode. During iris photography for iris authentication of the user, the moving lens group LM may move into the optical lens assembly 100. After user authentication, the mode of the electronic apparatus MG may be converted into a visible light photographing mode, and the moving lens group LM may move out of the optical lens assembly 100. As such, IR photography and visible light photography may be both performed via a single optical lens assembly. Referring to FIG. 15, the user may be in the viewing angle range of the optical lens assembly 100 included in the electronic apparatus MG, so that the irises of the user may be photographed, and thus user authentication may be performed with respect to the electronic apparatus MG (e.g., a mobile apparatus).

Figure 16:
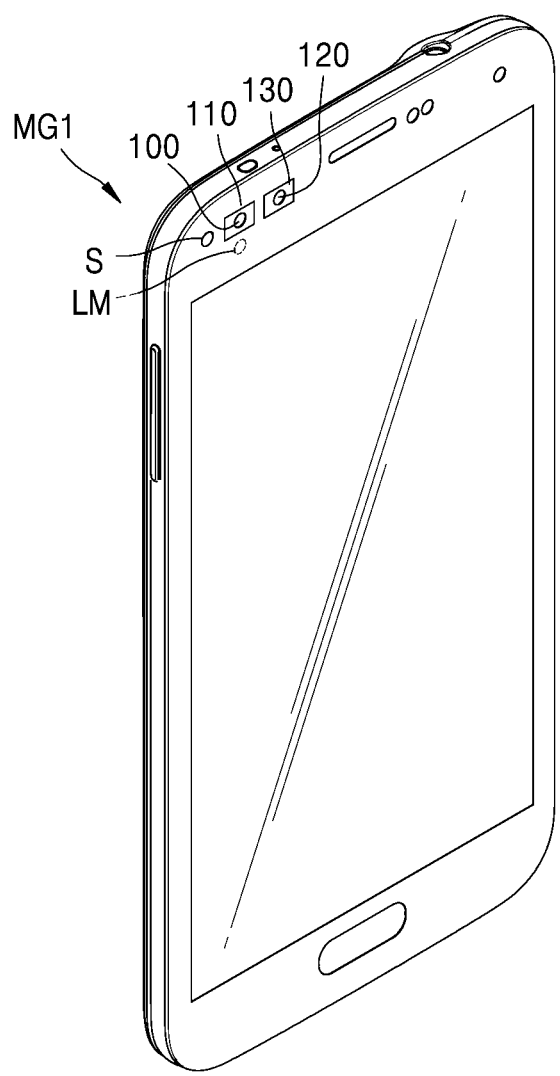
FIG. 16 illustrates another example of an electronic apparatus including an optical lens assembly according to various embodiments.

FIG. 16 illustrates another example of an electronic apparatus according to various embodiments. An electronic apparatus MG1 may include an optical lens assembly 100 and another optical lens assembly 120. The electronic apparatus MG1 may include an image sensor 110 corresponding to the optical lens assembly 100, and an image sensor 130 corresponding to the optical lens assembly 120. For example, the electronic apparatus according to various embodiments may include a front dual camera module. The optical lens assembly 100 is applicable to black and white lens systems capable of IR photography and black and white image capturing, and the optical lens assembly 120 is applicable to color lens systems. During IR photography for iris authentication, the optical lens assembly 100 may operate in an IR photographing mode. During general photography, the optical lens assembly 100 may operate in a black and white photographing mode and capture black and white images, and the optical lens assembly 120 may capture color images. The electronic apparatus MG1 may obtain high quality images by synthesizing the black and white images with the color images.

As another example, the optical lens assembly 100 and the optical lens assembly 120 may have different fields of view or different focal lengths. For example, the optical lens assembly 100 may be a standard lens system, and the optical lens assembly 120 may be a wide angle lens system. Alternatively, the optical lens assembly 100 may be a wide angle lens system, and the optical lens assembly 120 may be a telephoto lens system. As such, the electronic apparatus MG1 may include a plurality of optical lens assemblies, and may take pictures by selectively using the plurality of optical lens assemblies. Alternatively, the electronic apparatus MG1 may generate an image having a field of view (or focal length) between a field of view (or focal length) of the optical lens assembly 100 and a field of view (or focal length) of the optical lens assembly 120, by synthesizing respective images captured by the optical lens assemblies 100 and 120 with each other. The electronic apparatus MG1 may accomplish digital zooming via this image synthesis.

When the moving lens group LM is moved into the optical lens assembly 100 and thus user authentication via iris photography of a user is completed, the electronic apparatus MG1 may use the electronic apparatus MG1, and may take pictures by using the optical lens assembly 100 from which the moving lens group LM has been removed and the optical lens assembly 120.

The electronic apparatus 201 in a network environment 200, according to various embodiments, will be described below with reference to FIG. 17. The electronic apparatus 201 may include a bus 110, a processor 220, a camera module 225, a memory 230, the I/O interface 250, a display 260, and a communication interface 270. According to some embodiments, the electronic apparatus 201 may not include at least one of the above components or may additionally include another component.

The bus 210 may include a circuit for interconnecting the elements 210 through 270 and for allowing communication (e.g., a control message and/or data) between the elements 210 through 270.

The processor 220 may include one or more of a CPU, an AP, or a communication processor (CP). The processor 220 may control at least one component of the electronic apparatus 201 and/or execute an operation related to communication or a data process.

The camera module 225 is capable of capturing, for example, a still image or a moving image. According to an embodiment, the camera module 225 may include one or more image sensors (e.g., a front sensor or a rear sensor), a lens, an image signal processor (ISP), or a flash (e.g., an LED or a xenon lamp). For example, the optical lens assembly according to various embodiments may be applied to the camera module 225.

The memory 230 may include a volatile and/or nonvolatile memory. The memory 230 may store, for example, a command or data related to at least one component of the electronic apparatus 201. According to an example embodiment, the memory 230 may store software and/or a program 240. The program 240 may include, for example, a kernel 241, middleware 243, an application programming interface (API) 245, and/or an application program (or an application) 247. At least some of the kernel 241, the middleware 243, and the API 245 may be referred to as an operating system (OS).

The kernel 241 may control or manage system resources (e.g., the bus 210, the processor 220, the memory 230, etc.) used to execute operations or functions implemented in other programs (e.g., the middleware 243, the API 245, or the application program 247). The kernel 241 may provide an interface for controlling or managing the system resources, as the middleware 243, the API 245, or the application program 247 accesses individual components of the electronic apparatus 201.

The middleware 243 may operate as a relay for the API 245 or the application program 247 to communicate with the kernel 241 to exchange data.

Also, the middleware 243 may process one or more operation requests received from the application program 247 according to a priority. For example, the middleware 243 may assign, to at least one of the one or more operation requests received from the application program 247, a priority of using the system resource (e.g., the bus 210, the processor 220, or the memory 230) of the electronic apparatus 201. For example, the middleware 243 may process the one or more operation requests according to the assigned priority to perform scheduling or load balancing with respect to the one or more operation requests.

The API 245 is an interface enabling the application program 247 to control functions provided by the kernel 241 or the middleware 243, and may include at least one interface or function (e.g., instruction) for controlling a file, controlling a window, processing an image, or controlling a character.

The I/O interface 250 may operate, for example, as an interface capable of transmitting a command or data input from a user or another external apparatus to the other component(s) of the electronic apparatus 201. Also, the I/O interface 250 may output a command or data received from the other component(s) of the electronic apparatus 201 to the user or the other external apparatus.

The display 260 may include, but is not limited to, a liquid crystal display (LCD), a light-emitting diode (LED) display, an organic light-emitting diode (OLED) display, a microelectromechanical systems (MEMS) display, or an electronic paper display. The display 260 may display various contents (e.g., a text, an image, video, an icon, or a symbol) to users. The display 260 may include a touch screen, and may receive a touch, gesture, proximity, or hovering input using an electronic pen or a part of the body of the user.

The communication module 270 sets up communication between, for example, the electronic apparatus 201 and an external apparatus (e.g., a first external electronic apparatus 202, a second external electronic apparatus 204, or a server 206). For example, the communication interface 270 may be connected to a network 262 through wireless or wired communication and communicate with the external apparatus (e.g., the second external electronic apparatus 204 and/or the server 206).

The wireless communication may use, as a cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), or global system for mobile communications (GSM). Also, the wireless communication may include short-range communication 264. The short-range communication 264 may include at least one of wireless fidelity (WiFi), Bluetooth, near field communication (NFC), or a global navigation satellite system (GNSS). The GNSS may include, according to used regions or bandwidths, at least one of global positioning system (GPS), Glonass (Russian global navigation satellite system), Beidou navigation satellite system (BDS), or Galileo system (European global satellite-based navigation system). Herein, "GPS" and "GNSS" may be interchangeably used. The wired communication may include at least one of universal serial bus (USB), high definition multimedia interface (HDMI), recommended standard 232 (RS-232), or plain old telephone service (POTS). The network 262 may include a telecommunications network, for example, at least one of a computer network (e.g., a local area network (LAN) or a wide area network (WAN)), Internet, or a telephone network.

Each of the first and second external electronic apparatuses 202 and 204 may be of the same or different type compared to the electronic apparatus 201. According to an embodiment, the server 206 may include a group of one or more servers. According to various embodiments, all or some of operations performed in the electronic apparatus 201 may be performed in another electronic apparatus or other electronic apparatuses (e.g., the first or second external electronic apparatus 202 or 204 or the server 206). According to an embodiment, when the electronic apparatus 201 has to perform a function or a service automatically or upon a request, the electronic apparatus 201 may request another electronic apparatus (e.g., the first or second external electronic apparatus 202 or 204 or the server 206) to perform at least some functions associated with the function or the service, instead of or in addition to executing the function or the service itself. The other electronic apparatus (e.g., the first or second external electronic apparatus 202 or 204 or the server 206) may perform the requested function or an additional function and deliver a result of performing the requested function or additional function to the electronic apparatus 201. Then, the electronic apparatus 201 may process the received result without changes or additionally, and provide the requested function or service. To this end, for example, a cloud computing technology, a distributed computing technology, or a client-server computing technology may be used.

FIG. 18 is a block diagram of the electronic apparatus 301 according to various embodiments. The electronic apparatus 301 may include, for example, the whole or a portion of the electronic apparatus 201 of FIG. 17. The electronic apparatus 301 may include one or more processors 310 (e.g., an AP), a communication module 320, a subscriber identification module (SIM) 324, a memory 330, a sensor module 340, an input device 350, a display 360, the interface 370, an audio module 380, a camera module 391, a power management module 395, a battery 396, an indicator 397, and a motor 398.

The processor 310 may control a plurality of hardware or software components connected to the processor 310, by driving an OS or an application program, and may perform various data processing and calculations. The processor 310 may be implemented as, for example, a system on chip (SoC). According to an embodiment, the processor 310 may further include a graphic processing unit (GPU) and/or an image signal processor. The processor 310 may also include at least some (e.g., a cellular module 321) of the components illustrated in FIG. 18. The processor 310 may load a command or data received from at least one of other components (e.g., a non-volatile memory) into a volatile memory and process the command or data, and may store various data in the non-volatile memory.

The communication module 320 may have a configuration that is the same as or similar to the communication module 270 illustrated in FIG. 17. The communication module 320 may include the cellular module 321, a WiFi module 323, a Bluetooth (BT) module 325, a GNSS module (e.g., a GPS module, a Glonass module, a Beidou module, or a Galileo module) 327, an NFC module 328, and a radio frequency (RF) module 329.

The cellular module 321 may provide, for example, a voice call service, a video call service, a text service, or an Internet service, through a communication network. According to an embodiment, the cellular module 321 may perform identification and certification on the electronic apparatus 301 within a communication network by using the SIM 324 (e.g., a SIM card). According to an embodiment, the cellular module 321 may perform at least some of the functions that may be provided by the processor 310. According to an embodiment, the cellular module 321 may include a CP.

Each of the WiFi module 323, the BT module 325, the GNSS module 327, and the NFC module 328 may include a processor for processing data transmitted/received through the corresponding module. According to an embodiment, at least some (e.g., two or more) of the cellular module 321, the WiFi module 323, the BT module 325, the GNSS module 327, and the NFC module 328 may be included in one integrated chip (IC) or an IC package.

The RF module 329 may transmit and receive, for example, a communication signal (e.g., an RF signal). The RF module 329 may include, for example, a transceiver, a power amp module (PAM), a frequency filter, a low noise amplifier (LNA), or an antenna. According to another embodiment, at least one of the cellular module 321, the WiFi module 323, the BT module 325, the GNSS module 327, or the NFC module 328 may transmit and receive an RF signal through a separate RF module.

The SIM 324 may include, for example, a card including an SIM and/or an embedded SIM, and may include unique identification information (e.g., integrated circuit card identifier (ICCID)) or subscriber information (e.g., international mobile subscriber identity (IMSI)).

The memory 330 may includes an embedded memory 332 or an external memory 334. The embedded memory 332 may include at least one of a volatile memory (e.g., dynamic random access memory (DRAM), static RAM (SRAM), or synchronous dynamic RAM (SDRAM)), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, a hard drive, or a solid state drive (SSD)).

The external memory 334 may include a flash drive (e.g., a compact flash (CF), a secure digital (SD), micro-SD, mini-SD, extreme digital (xD), a multi-media card (MMC), or a memory stick). The external memory 334 may be functionally and/or physically connected to the electronic apparatus 301 via any one of various interfaces.

The sensor module 340 may measure a physical amount or detect an operation state of the electronic apparatus 301, and may convert measured or detected information to an electrical signal. The sensor module 340 includes at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., red, green, and blue (RGB) sensor), a biometric sensor 340I, a temperature/humidity sensor 340J, an illumination sensor 340K, or an ultraviolet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an IR sensor, an iris sensor, and/or a fingerprint sensor. The sensor module 340 may further include a control circuit for controlling at least one sensor therein. According to an embodiment, the electronic apparatus 301 may also include a processor configured to control the sensor module 340 as part of or separately from the processor 310, to control the sensor module 340 while the processor 310 is in a sleep state.

The input device 350 may include a touch panel 352, a (digital) pen sensor 354, a key 356, and an ultrasonic input device 358. The touch panel 352 may use at least one of a capacitive method, a resistive method, an infrared method, or an ultrasonic method. The touch panel 352 may further include a control circuit. The touch panel 352 may further include a tactile layer and thus may provide a tactile response to a user.

The (digital) pen sensor 354 may be, for example, a part of the touch panel, or may include a special recognition sheet. The key 356 may include a physical button, an optical key, or a keypad. The ultrasonic input device 358 may sense ultrasonic waves generated in an input instrument through a microphone 388 and may check data corresponding to the sensed ultrasonic waves.

The display 360 may includes a panel 362, a hologram device 364, and a projector 366. The panel 362 may have a configuration that is the same as or similar to the display 260 illustrated in FIG. 17. The panel 362 may be realized to be flexible, transparent, or wearable. The panel 362 may be configured as one module with the touch panel 352. According to an embodiment, the panel 362 may include a pressure sensor (or a force sensor) capable of measuring the intensity of a pressure with respect to a user touch. The pressure sensor may be integrated with the touch panel 352 or may be realized as at least one sensor separate from the touch panel 352. The hologram device 364 may show a stereoscopic image in the air by using interference of light. The projector 366 may project light onto a screen to display an image. The screen may be located inside or outside the electronic apparatus 301. According to an embodiment, the display 360 may further include a control circuit for controlling the panel 362, the hologram device 364, or the projector 366.

The interface 370 may include an HDMI 372, a USB 374, an optical interface 376, or a D-subminiature (D-sub) 378. The interface 370 may be included in, for example, the communication interface 370 of FIG. 18. Additionally or alternatively, the interface 370 may include, for example, a mobile high-definition link (MHL) interface, a SD card/MMC interface, or an infrared data association (IrDA) standard interface.

The audio module 380 may bi-directionally convert sound and an electrical signal. At least some components of the audio module 380 may be included in the I/O interface 245 of FIG. 17. The audio module 380 may process sound information that is input or output through a speaker 382, a receiver 384, an earphone 386, or the microphone 388.

The camera module 391 is capable of capturing a still image or a moving image. According to an embodiment, the camera module 391 may include one or more image sensors (e.g., a front sensor or a rear sensor), a lens, an ISP, or a flash (e.g., an LED or a xenon lamp). For example, the optical lens assembly according to various embodiments may be applied to the camera module 391.

The power management module 395 may manage power of the electronic apparatus 301. The electronic apparatus 301 may be an electronic apparatus that receives electric power through a battery, but embodiments are not limited thereto. According to an embodiment, the power management module 395 may include a power management integrated circuit (PMIC), a charger IC, or a battery or fuel gauge. The PMIC may use a wired and/or wireless charging method. The wireless charging method may include a magnetic resonance method, a magnetic inducing method, or an electromagnetic method, and may further include an additional circuit for wireless charging, such as a coil loop, a resonance circuit, or a rectifier. The battery gauge may measure a remaining capacity of the battery 396, and a voltage, current, or temperature during charging of the battery 396. The battery 396 may include, for example, a rechargeable battery and/or a solar battery.

The indicator 397 may display a particular state, for example, a booting state, a message state, or a charging state, of the electronic apparatus 301 or a part (e.g., the processor 310) thereof. The motor 398 may convert an electrical signal into mechanical vibration and may generate vibration or a haptic effect. Although not shown in FIG. 18, the electronic apparatus 301 may include a processing device for supporting a mobile TV, for example, a GPU. The processing device for supporting a mobile TV may process media data according to standards of, for example, digital multimedia broadcasting (DMB), digital video broadcasting (DVB), or media-Flo™.

An optical lens assembly according to an embodiment may include a first lens having positive refractive power, a second lens having negative refractive power, a third lens having positive refractive power, a fourth lens having refractive power, and a moving lens group movable to be inserted or removed between the third lens and the fourth lens, wherein the first, second, third, and fourth lenses and the moving lens group are sequentially arranged from an object side to an image side. The moving lens group is moved between the third lens and the fourth lens for IR photography, and may satisfy the following inequality:

$$0.14 < T34/OAL < 0.3$$

$$V3 - V2 > 35 \qquad \text{<Inequality>}$$

where T34 indicates an air gap between the third lens and the fourth lens, OAL indicates an overall length of the optical lens assembly, V2 indicates an Abbe number of the second lens, and V3 indicates an Abbe number of the third lens.

For example, the optical lens assembly may further include a lens having positive or negative refractive power, to be closest to the image side.

For example, the moving lens group may be configured to correct a focus difference that is generated according to object distances and the wavelength of light that is used.

For example, the moving lens group may include at least one aspherical lens.

For example, the optical lens assembly may further include an optical device, and the optical device may include a broad band-pass filter that passes light having a wavelength of 400 to 1000 nm.

For example, the moving lens group may include a coating that passes light having a wavelength of 800 to 1000 nm.

For example, the optical lens assembly may satisfy the following inequality:

$$2 < f2/f < -0.8 \qquad \text{<Inequality>}$$

where f indicates the focal length of the optical lens assembly, and f2 indicates the focal length of the second lens.

For example, the optical lens assembly may satisfy the following inequality:

$$0 < f_{IR} < 300 \qquad \text{<Inequality>}$$

where $f_{IR}$ indicates the focal length of the moving lens group.

For example, the moving lens group may include a flat panel lens and a one-sided plane lens.

For example, the first lens may have an object side surface that is convex.

For example, the second lens may have an image side surface that is concave.

An optical lens assembly according to an embodiment may include a first lens having a convex object side surface, a second lens arranged on an image side of the first lens and having a concave image side surface, a third lens arranged on an image side of the second lens, and an image side lens arranged closest to the image side, and may include a moving lens group that is movable to be inserted or removed between the third lens and the image side lens. The moving lens group may include an IR pass coating.

For example, the optical lens assembly may satisfy the following inequality:

$$0.14 < T34/OAL < 0.3 \qquad \text{<Inequality>}$$

where T34 indicates an air gap between the third lens and the fourth lens, and OAL indicates an overall length of the optical lens assembly.

For example, the optical lens assembly may satisfy the following inequality:

$$V3 - V2 > 35 \qquad \text{<Inequality>}$$

where V2 denotes the Abbe number of the second lens and V3 denotes the Abbe number of the third lens.

For example, the optical lens assembly may satisfy the following inequality:

$$2 < f2/f < -0.8 \qquad \text{<Inequality>}$$

where f indicates the focal length of the optical lens assembly, and f2 indicates the focal length of the second lens.

For example, the optical lens assembly may satisfy the following inequality:

$$0 < f_{IR} < 300 \qquad \text{<Inequality>}$$

where $f_{IR}$ indicates the focal length of the moving lens group.

For example, the moving lens group may include a lens group in which a flat panel lens has been bonded to a one-sided plane lens or a meniscus lens.

An electronic apparatus according to an embodiment may include an optical lens assembly and an image sensor, and the optical lens assembly may include a first lens having positive refractive power, a second lens having negative refractive power, a third lens having positive refractive power, a fourth lens having refractive power, and a moving lens group that is movable to be inserted or removed between the third lens and the fourth lens, wherein the first, second, third, and fourth lenses and the moving lens group are sequentially arranged from an object side to an image side. The moving lens group is moved between the third lens and the fourth lens for IR photography, and may satisfy the following inequality:

$$0.14 < T34/OAL < 0.3$$

$$V3-V2 > 35 \qquad \text{<Inequality>}$$

where T34 indicates an air gap between the third lens and the fourth lens, OAL indicates an overall length of the optical lens assembly, V2 indicates an Abbe number of the second lens, and V3 indicates an Abbe number of the third lens.

For example, the moving lens group may include a coating that passes light having a wavelength of 800 to 1000 nm.

For example, the electronic apparatus may further include another optical lens assembly. The optical lens assembly may be configured to perform black and white photography, and the other optical lens assembly may be configured to perform color photography.

Each of technical components herein may be configured as one or more components, and a name of the component may differ according to a type of an electronic apparatus. According to various embodiments, the electronic apparatus may include at least one of the aforementioned components. Some of the aforementioned components may be omitted, or other components may be further included in addition to the aforementioned components. Some of the components of an electronic apparatus according to various embodiments are merged into a single entity, and the single entity may still perform the functions of the components not yet merged.

The term "module" used herein may refer to a unit including one of hardware, software, and firmware, or a combination thereof. The term "module" may be interchangeably used with a term such as a unit, a logic, a logical block, a component, or a circuit. The "module" may be a standalone unit of an integrally formed component or a part of the standalone. The "module" may be a standalone unit performing one or more functions, or a part of the standalone unit. The "module" may be implemented mechanically or electronically. For example, the "module" may include at least one of application specific integrated circuit (ASIC) chips, field programmable gate arrays (FPGAs), or programmable logic arrays (PLAs) that perform some operations, which have already been known or will be developed in the future.

At least a part of a device (for example, modules or functions thereof) or a method (for example, operations) according to various embodiments may be implemented with instructions stored in computer-readable storage media in the form of a program module. When the instructions are executed by a processor (e.g., the processor 220 of FIG. 17), the one or more processors may perform functions corresponding to the instructions. The computer-readable storage media may be, for example, the memory 230.

Examples of the computer-readable storage media include hard disks, floppy disks, magnetic media (e.g., magnetic tapes), and optical media (e.g., compact disc read only memories (CD-ROMs) and digital versatile disks (DVDs)), magneto-optical media (e.g., floptical disks)), and hardware devices (e.g., read only memories (ROMs), random access memories (RAMs) and flash memories). Examples of the program commands may include advanced language codes that can be executed by a computer by using an interpreter or the like as well as machine language codes made by a compiler. The hardware devices can be configured to function as one or more software modules so as to perform operations according to various embodiments, or vice versa. Modules or program modules according to various embodiments may include at least one of the aforementioned components. Some of the aforementioned components may be omitted, or other components may be further included in addition to the aforementioned components. Operations performed by modules, program modules, or other components according to various embodiments may be executed in a sequential, parallel, iterative, or heuristic manner. Some of the operations may be executed in another sequence, some of the operations may be omitted, or other operations may be further included in addition to the operations. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. An optical lens assembly comprising:
a first lens having a positive refractive power, a second lens having a negative refractive power, a third lens having a positive a refractive power, a fourth lens having a refractive power, and a moving lens group that is movable to be inserted in or removed from between the third lens and the fourth lens, the first, second, third, and fourth lenses and the moving lens group being sequentially arranged from an object side to an image side,
wherein the moving lens group is moved into between the third lens and the fourth lens for infrared (IR) photography,
and the optical lens assembly satisfies the following inequality:
and the optical lens assembly satisfies the following inequality:

$$0.14 < T34/OAL < 0.3$$

$$V3-V2 > 35 \qquad \text{<Inequality>}$$

where T34 indicates an air gap between the third lens and the fourth lens, OAL indicates an overall length of the optical lens assembly, V2 indicates an Abbe number of the second lens, and V3 indicates an Abbe number of the third lens.

2. The optical lens assembly of claim 1, further comprising a lens having a positive or negative refractive power, closest to the image side.

3. The optical lens assembly of claim 1, wherein the moving lens group is configured to correct a focus difference that is generated according to an object distance and a wavelength of light that is used.

4. The optical lens assembly of claim 1, wherein the moving lens group comprises at least one aspherical lens.

5. The optical lens assembly of claim 1,
further comprising an optical device, wherein the optical device comprises a broad band-pass filter that passes light having a wavelength of about 400 nm to about 1000 nm.

6. The optical lens assembly of claim 1, wherein
the moving lens group comprises a coating that transmits light having a wavelength of about 800 nm to about 1000 nm.

7. The optical lens assembly of claim 1, satisfying the following inequality:

$$2 < f2/f < -0.8 \quad \text{<Inequality>}$$

where f indicates a focal length of the optical lens assembly, and f2 indicates a focal length of the second lens.

8. The optical lens assembly of claim 1, satisfying the following inequality:

$$0 < f_{IR} < 300 \quad \text{<Inequality>}$$

where $f_{IR}$ indicates a focal length of the moving lens group.

9. The optical lens assembly of claim 1, wherein the moving lens group comprises a flat panel lens and a one-sided plane lens.

10. An optical lens assembly comprising:
a first lens having a convex object side surface, a second lens arranged on an image side of the first lens and having a concave image side surface, a third lens arranged on an image side of the second lens, an image side lens arranged closest to an image side, and
a moving lens group that is movable to be inserted in or removed from between the third lens and the image side lens,
wherein the moving lens group comprises an infrared (IR) transmitting coating, and the optical lens assembly satisfies the following inequality:

$$0.14 < T34/OAL < 0.3 \quad \text{<Inequality>}$$

where T34 indicates an air gap between the third lens and a fourth lens, and OAL indicates an overall length of the optical lens assembly.

11. The optical lens assembly of claim 10, satisfying the following inequality:

$$V3 - V2 > 35 \quad \text{<Inequality>}$$

where V2 indicates an Abbe number of the second lens and V3 indicates an Abbe number of the third lens.

12. The optical lens assembly of claim 10, satisfying the following inequality:

$$-2 < f2/f < -0.8 \quad \text{<Inequality>}$$

where f indicates a focal length of the optical lens assembly, and f2 indicates a focal length of the second lens.

13. The optical lens assembly of claim 10, satisfying the following inequality:

$$0 < f_{IR} < 300 \quad \text{<Inequality>}$$

where $f_{IR}$ indicates a focal length of the moving lens group.

14. An electronic apparatus comprising:
an optical lens assembly; and
an image sensor,
wherein the optical lens assembly comprises a first lens having a positive refractive power, a second lens having a negative refractive power, a third lens having a positive refractive power, a fourth lens having a refractive power, and a moving lens group that is movable to be inserted in or removed from between the third lens and the fourth lens, wherein the first, second, third, and fourth lenses and the moving lens group are sequentially arranged from an object side to an image side,
the moving lens group is moved between the third lens and the fourth lens for infrared (IR) photography, and
the optical lens assembly satisfies the following inequality:

$$0.14 < T34/OAL < 0.3$$

$$V3 - V2 > 35 \quad \text{<Inequality>}$$

where T34 indicates an air gap between the third lens and the fourth lens, OAL indicates an overall length of the optical lens assembly, V2 indicates an Abbe number of the second lens, and V3 indicates an Abbe number of the third lens.

* * * * *